United States Patent
Zhu et al.

(10) Patent No.: US 9,672,740 B2
(45) Date of Patent: Jun. 6, 2017

(54) PRIVACY PROTECTED PUBLIC TRANSIT DATA MINING METHOD AND SYSTEM FOR EFFECTIVE PASSENGER DETOURING

(71) Applicant: Hitachi, Ltd., Tokyo (JP)

(72) Inventors: Jiang Zhu, Singapore (SG); Kaushik Triyambaka Mysur, Singapore (SG); Hirokazu Ikeda, Singapore (SG); Naoto Matsunami, Singapore (SG)

(73) Assignee: Hitachi, Ltd., Tokyo (JP)

( * ) Notice: Subject to any disclaimer, the term of this patent is extended or adjusted under 35 U.S.C. 154(b) by 200 days.

(21) Appl. No.: 14/331,577

(22) Filed: Jul. 15, 2014

(65) Prior Publication Data

US 2016/0018231 A1    Jan. 21, 2016

(51) Int. Cl.
| | | |
|---|---|---|
| G08G 1/123 | (2006.01) |
| H04W 4/02 | (2009.01) |
| H04W 12/02 | (2009.01) |
| G06F 17/30 | (2006.01) |
| G01C 21/34 | (2006.01) |
| G08G 1/005 | (2006.01) |

(52) U.S. Cl.
CPC ......... *G08G 1/123* (2013.01); *G01C 21/3484* (2013.01); *G06F 17/3087* (2013.01); *G08G 1/005* (2013.01); *H04W 4/028* (2013.01); *H04W 12/02* (2013.01)

(58) Field of Classification Search
CPC ........................ G01C 21/3617; G01C 21/3415
See application file for complete search history.

(56) References Cited

U.S. PATENT DOCUMENTS

| | | | | |
|---|---|---|---|---|
| 2007/0010942 A1* | 1/2007 | Bill | ..................... | G01C 21/3679 701/424 |
| 2008/0147313 A1* | 6/2008 | Nesbitt | ................ | G01C 21/367 701/426 |
| 2010/0070171 A1* | 3/2010 | Barbeau | ............. | G01C 21/3617 701/408 |
| 2011/0231087 A1* | 9/2011 | Johnson | ............. | G01C 21/3461 701/533 |
| 2011/0246404 A1* | 10/2011 | Lehmann | ............... | G06Q 10/02 706/21 |

(Continued)

FOREIGN PATENT DOCUMENTS

| | | |
|---|---|---|
| EP | 2 628 101 A1 | 8/2013 |
| WO | 01/63536 A1 | 8/2001 |
| WO | 2013/171780 A1 | 11/2013 |

*Primary Examiner* — Redhwan K Mawari
*Assistant Examiner* — Michael Whalen
(74) *Attorney, Agent, or Firm* — Mattingly & Malur, PC

(57) ABSTRACT

A method and system that provides detouring services to passengers and transportation operators. Transportation operators send data indicating prior uses of the operator to the passengers' mobile device and the system on the mobile device compiles the data to form travel patterns of the passenger. The travel patterns are assigned a probability indicating the frequency the travel pattern is used by the passenger. When a disruption of a service of an operator occurs, a detouring service provides detour suggestions to the passengers and travel demand changes to the operators. In another approach, an in-station display displays suggested detour routes based on the top destinations of stranded passengers and the passenger's mobile phones are not used to display or perform detouring.

7 Claims, 31 Drawing Sheets

(56) References Cited

U.S. PATENT DOCUMENTS

| | | |
|---|---|---|
| 2011/0305369 A1 | 12/2011 | Bentley et al. |
| 2013/0203043 A1 | 8/2013 | Ozcan et al. |
| 2014/0156396 A1* | 6/2014 | deKozan ............ G06Q 30/0261 705/14.53 |
| 2014/0279723 A1* | 9/2014 | McGavran ........... G06N 99/005 706/11 |
| 2015/0350843 A1* | 12/2015 | Jensen ...................... G06F 9/54 455/456.3 |

* cited by examiner

| TRANSIT DATA 0200 | PASSENGER ID 0210 | BOARDING STATION 0220 | ALIGHTING STATION 0230 | BOARDING DATE/TIME 0240 | ALIGHTING DATE/TIME 0250 | SERVICE 0260 | |
|---|---|---|---|---|---|---|---|
| | 32405 | LOCATION 1 | LOCATION 2 | 2013/05/16 08:00:00 | 2013/05/16 08:40:00 | TRAIN 1 | ⋮ |
| | ⋮ | ⋮ | ⋮ | ⋮ | ⋮ | ⋮ | ⋮ |

*FIG. 2*

| 0310 | 0700 | 0710 | 0720 | 0730 | 0740 | 0750 | 0760 |
|---|---|---|---|---|---|---|---|
| TRIP PATTERNS | PASSENGER ID | TRIP ID | ORIGIN | DESTINATION | TIME RANGE | SERVICE | TRIP PROBABILITY |
| | 32405 | 001 | LOCATION 1 | LOCATION 2 | 08:00:00-08:40:00 | TRAIN 1 | 90% |
| | 32405 | 002 | LOCATION 2 | LOCATION 3 | 08:40:00-09:10:00 | BUS 24 | 60% |
| | 32405 | 003 | LOCATION 3 | LOCATION 4 | 09:10:00-09:40:00 | TRAIN 2 | 30% |
| | ... | ... | ... | ... | ... | ... | ... |

*FIG. 8*

| TRAVEL PATTERNS | JOURNEY ID | ORIGIN | DESTINATION | TIME RANGE | JOURNEY PROBABILITY | TRIP ID | ... |
|---|---|---|---|---|---|---|---|
| | 0001 | LOCATION 1 | LOCATION 4 | 08:00:00-09:40:00 | 30% | 001, 002, 003 | ... |
| | 0002 | LOCATION 1 | LOCATION 3 | 08:00:00-09:10:00 | 30% | 001, 002 | ... |
| | 0003 | LOCATION 1 | LOCATION 2 | 08:00:00-08:40:00 | 30% | 001 | ... |
| | ... | ... | ... | ... | ... | ... | ... |

| 0360 | 0800 | 0810 | 0820 | 0830 | 0840 | 0850 |
|---|---|---|---|---|---|---|
| DISRUPTION INFORMATION | DISRUPTION ID | SERVICE | STARTING STATION | ENDING STATION | STARTING TIME | SERVICE RESUME TIME |
| | 00021 | TRAIN 1 | LOCATION 1 | LOCATION 4 | 2013/05/16 08:40:00 | 2013/05/16 11:40:00 |
| | ... | ... | ... | ... | ... | ... |

| DETOUR REQUEST | ORIGIN | DESTINATION | STARTING TIME | ⋮ |
|---|---|---|---|---|
| 0340 | 1300 | 1310 | 1320 | |
| | LOCATION 1 | LOCATION 3 | 2013/05/16 08:00:00 | ⋮ |

*FIG. 14*

| DETOUR SUGGESTION | ROUTE INFORMATION | TRAVEL TIME | COST | ... |
|---|---|---|---|---|
| | BUS 21 TO LOCATION 1, TRAIN 1 TO LOCATION 2 | 45 MINUTES | $1.2 | ... |

| 0370 | 1800 | 1810 | 1820 | 1830 | 1840 |
|---|---|---|---|---|---|
| TRAVEL DEMAND CHANGES | SERVICE | CHANGES | STATIONS | TIME RANGE | DISRUPTION ID |
| | TRAIN 1 | +400 | LOCATION 1- LOCATION 4 | 08:00:00- 10:10:00 | 00021 |
| | ⋮ | ⋮ | ⋮ | ⋮ | ⋮ |

*FIG. 18*

| AFFECTED PASSENGER LIST 2010 | ENCRYPTED ID 2300 | DESTINATION 2310 | ARRIVAL TIME 2320 | TRIP PROBABILITY 2330 |
|---|---|---|---|---|
| | ?#$ | LOCATIOIN 2 | 08:40:00 | 70% |
| | &*D | LOCATION 3 | 09:10:00 | 60% |
| | ... | ... | ... | ... |

*FIG. 24*

| TRIP PATTERN REQUESTS 2020 | ENCRYPTED ID 2500 | DESTINATION 2510 | ARRIVAL TIME 2520 | PROBABILITY 2530 |
|---|---|---|---|---|
| | ?#$ | LOCATION 2 | 08:40:00 | 70% |
| | ... | ... | ... | ... |

FIG. 26

| SIMPLIFIED TRIP PATTERNS | ENCRYPTED ID | SOURCE | DESTINATION | ARRIVAL TIME | TRIP PROBABILITY |
|---|---|---|---|---|---|
| | ?#$ | DISRUPTED LOCATION | LOCATION 2 | 08:40:00 | 70% |
| | | LOCATION 2 | LOCATION 4 | 08:55:00 | 30% |
| | | LOCATION 4 | LOCATION 5 | 09:10:00 | 10% |

3010 — SIMPLIFIED TRIP PATTERNS
3012 — ENCRYPTED ID
3014 — SOURCE
3016 — DESTINATION
3018 — ARRIVAL TIME
3020 — TRIP PROBABILITY

FIG. 27

PRIVACY PROTECTED PUBLIC TRANSIT DATA MINING METHOD AND SYSTEM FOR EFFECTIVE PASSENGER DETOURING

BACKGROUND OF THE INVENTION

1. Technical Field

The present invention generally relates to a method and system for providing passengers using transit systems with detour information in a manner that protects the privacy of the passenger's and operator's data from being exposed to parties outside of the system.

2. Description of the Related Art

Detouring systems for transit operators of the prior art require all operators to upload their transit data to the detouring service provider (third party), so as to mine the passengers' travel patterns. Examples of such systems are described in WO2001063536 A1 and WO2013171780 A1. Such a travel pattern mining approach is mainly a two-step process: 1) chain the trips of each passenger to journeys according to the trip origin, destination, and time range; and 2) search for patterns in the chained journeys and store the found patterns as the passenger's travel patterns. When a disruption in a transit route happens (thereby triggering a need for a detour), the operator informs the detouring service provider of the latest disruption information, e.g., the service disrupted and expected service resume time. The detouring service provider then identifies the affected passengers through comparing the passengers' travel patterns with the disruption information, and search detours for those affected. In addition, systems of the prior art help the operators estimate the travel demand changes during disruption through analyzing the affected passengers' detouring behaviors. This approach enables effective detouring services, but the privacy of transit data is not protected. This privacy issue may prevent such solution from being applied in commercial systems.

The privacy issue can be addressed by utilizing the passengers' own mobile devices for transit data storage and mining. Mobile devices have been used as computing resources in various applications such as described in EP2628101 A1 and US20130203043 A1. Using this approach, the operators upload transit data to the corresponding passengers' mobile devices periodically. On the mobile devices, an application can be installed to analyze the travel patterns as discussed above. When a disruption happens, the operator will send the disruption information to all passengers' mobile devices, and the installed application will identify whether the passenger is affected and search detours of the affected journeys. Using this approach, the data privacy is protected as the transit data is not shared with any third party. However, with this approach the detouring services are limited. The approach cannot assist the operators in estimating the travel demand changes due to service disruption, as the passengers' travel patterns and detouring behaviors are only available to the passengers themselves.

BRIEF SUMMARY OF THE INVENTION

1. Problem to be solved

Public transit disruptions can delay the passengers' scheduled journeys, cause road congestions, and even paralyze transit networks. To avoid these issues, effective detouring services should be provided to the passengers. The passengers should be notified of the disruption in time and suggested with personalized detours proactively. The operators should be informed of travel demand changes during the service disruption to take countermeasures, such as allocating alternative types of transportation.

To achieve such detouring services, understanding the passengers' travel patterns is essential. Based on the travel patterns, the affected passengers and journeys can be identified. Personalized detours can then be searched and travel demand changes can be estimated.

The transit data recorded by smart cards are important resources to derive the travel patterns. However, existing approaches require sharing the passengers' transit data with third parties, which raises the privacy concerns and this may not be acceptable to the passengers and operators. The transit data can be linked to the passengers' social and economic information, which has the potential to be dangerous if mal-intended personnel have such information. In addition, the data contains the operators' customer information. Disclosing this information to the competitors may have negative effects on their business.

Accordingly it is an object of the present invention to provide a travel pattern mining approach that protects the transit data privacy and supports effective passenger detouring services.

2. Summary

The present invention discloses a travel pattern mining approach that protects the transit data privacy and supports effective passenger detouring services. In general, there are two main steps involved in this approach: 1) probabilistic trip patterns mining; and 2) probability-based trip chaining. The probabilistic trip patterns mining step utilizes each operator's own transit records to derive the passengers' trip patterns and evaluate the probability of each trip. The trip patterns are sent to the mobile device of the passenger. The probability-based trip chaining step, which is performed on the passengers' mobile phone, chains the trips based on their probability, origin, destination, and time range to form the passengers travel patterns. Further aspects and advantages of the invention will become apparent in the detailed description section and the supporting drawings.

BRIEF DESCRIPTION OF THE DRAWINGS

FIG. 2 shows data recorded by each operator by using integrated circuit cards according to embodiments of the present invention.

FIG. 8 illustrates exemplary information of trip patterns according to an embodiment of the present invention.

FIG. 10 illustrates exemplary information of travel patterns according to an embodiment of the present invention.

FIG. 12 illustrates exemplary information of disruption information sent by an operator to the passenger's mobile devices and detouring service provider according to the first embodiment of the present invention.

FIG. 14 illustrates exemplary information of a detour request generated by the personalized detouring service module of a passenger's mobile device according to the first embodiment of the present invention.

FIG. 16 illustrates exemplary information of a detour suggestion created by the detour request processing module of the detouring service provider according to the first embodiment of the present invention.

FIG. 18 illustrates exemplary information of travel demand changes generated by the travel demand changes analysis module of the detouring service provider according to the first embodiment of the present invention.

FIG. 24 illustrates exemplary information of an affected passenger list generated by the affected passenger identification module of an operator according to the second embodiment of the present invention.

FIG. 26 illustrates exemplary information of a trip pattern request generated by the affected passenger list processing module of the detouring service provider according to the second embodiment of the present invention.

FIG. 27 illustrates exemplary information of a simplified trip patterns table according to an embodiment of the present invention.

DETAILED DESCRIPTION OF THE INVENTION

Figure 1:
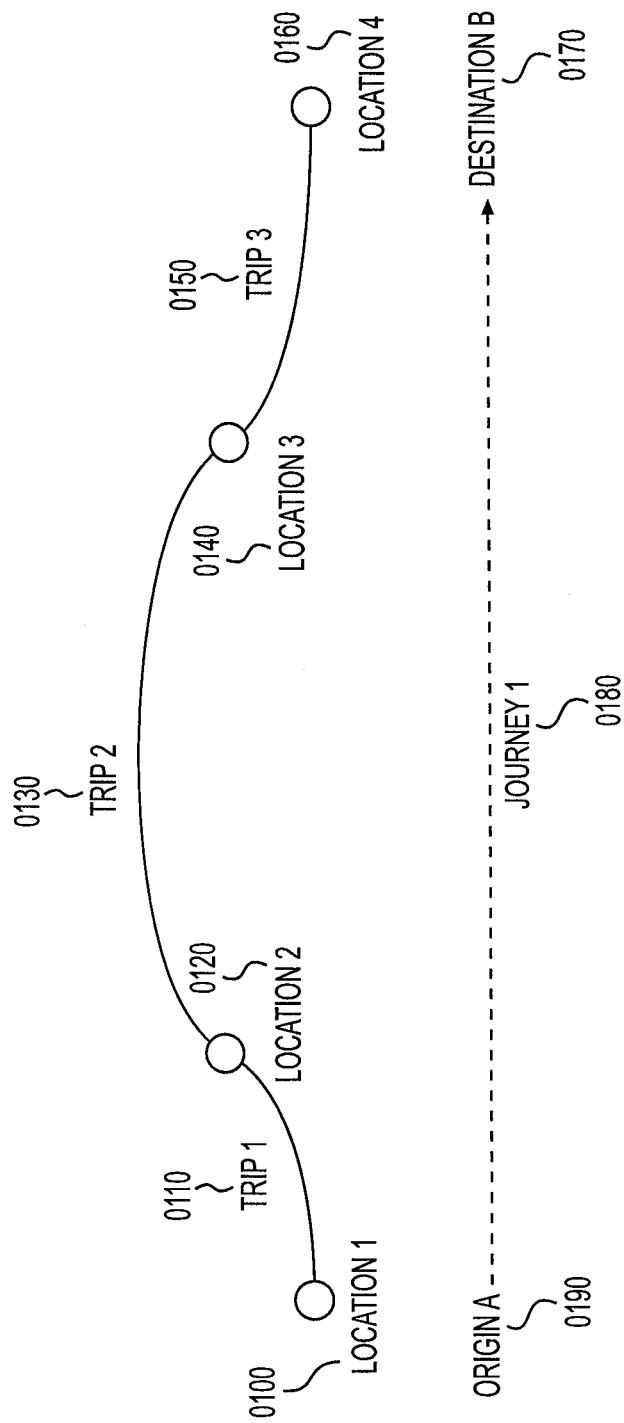
FIG. 1 is a diagram illustrating the relationship between multiple trip patterns of a passenger and a journey of a passenger according to the embodiments of the present invention.

In the following detailed description, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "an embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms or processes and symbolic representations of operations within a computer. These algorithmic descriptions and symbolic representations are the means used by those skilled in the data processing arts to most effectively convey the essence of their innovations to others skilled in the art. An algorithm or process is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," "mining," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Some embodiments of the present invention relate to an apparatus (one or more apparatuses) for performing the operations herein. The apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. The operations described in flowcharts, for example, may be executed by one or more processing devices, e.g., central processing units (CPUs), processors, or controllers.

In general, passengers use different transit operators, such as buses or trains, to travel to different locations. When an event occurs that disrupts or interrupts a travel route provided by a service of an operator from a first location to a second location along a person's journey, the event will hereinafter be referred to a disruption. For example, an event may occur which causes the trip (i.e. service along a route) from a first location to a second location to be disrupted. As a result of the disruption, the passenger cannot take the service to get from the first location to the second location and the passenger needs a detour route. The present invention provides detour information to the passenger on the passenger's mobile device (as in the first embodiment) or on a publicly viewed display (as in the second embodiment) operated and controlled by a detouring service provider, but located in a station of an operator at a location.

In the following description, an operator refers to a transportation service, such as a bus company or a train company (metro or subway). An operator operates one or more services (such as a bus or train), which stops or travels through stations along a route to provide transportation for a passenger from one geographical location to another.

FIG. 1 is a diagram illustrating the relationship between a journey and multiple trip patterns according to the embodiments of the present invention. A journey is made up of one or more trips and has an origin and an ultimate destination. Along a journey, a passenger may stop or continue through many locations and use one or more operators. A trip is a one piece of the journey and represents transportation using an operator between one location and another location in the journey. As shown in FIG. 1, a passenger has a journey from an origin A and an ultimate destination B. The journey includes 3 trips, Trip 1 0110, Trip 2 0130, and Trip 3 0150. Trip 1 involves the passenger using transportation of an operator from Location 1 0100 to Location 2 0120. In this example, Location 2 0120 and Location 3 0140 are transfer stations connecting Trip 1 0110 with Trip 2 0130 and Trip 2 0130 with Trip 3 0150, respectively.

In the first embodiment, a travel pattern mining approach that protects the transit data of passengers to alleviate privacy concerns and supports effective passenger detouring services is disclosed. The following approach will be described within a passenger detouring system that provides detouring services (i.e., information) to both passengers and operators.

The present invention utilizes transit data of each passenger, which is collected and stored by each operator. FIG. 2 is an exemplary table illustrating the transit data 0200 recorded by using a smart card (i.e., non-contact integrated circuit cards or contact integrated circuit card) for a passenger when the passenger uses a service provided by an operator at a ticket gate of a station, for example. As is well known, smart cards are used in a plurality of applications and contexts such as identification, authentication, data storage, and transactions involving services. FIG. 2 shows data recorded by each operator at ticket gates, for example, by using smart cards according to embodiments of the present invention. In the context of the present invention, the smart card is used to provide each operator with data including a boarding station 220, an alighting (exiting) station 230, boarding date and time 240, alighting date and time 250, and service (i.e., information indicating a train, bus, or route) used by the a passenger. The transit data 200 is recorded by each operator in a database and uses a passenger ID 210 as a way of identifying one passenger's data from another. The passenger ID 210 is unique to each passenger and the passenger ID used to identify the passenger is the same for each operator. Each passenger is identified with a passenger ID which is unique across all operators. The passenger may have one or more smart cards (smart card numbers) that can be linked to their passenger ID. Smart cards may have been bought by a passenger from different operators over the time due to different marketing discounts, for example. These smart cards may be interoperable across all operators or specific to an operator depending upon the operator's business strategy and collaborations between the operators. But, as mentioned above, the Passenger ID is unique across all operators. The transit data described in FIG. 2 is exemplary and the transit data may include other data.

Of course, using a smart card to conduct a transaction between an operator and a passenger is not a limitation or a requirement and the transit data may be collected by other means. The smart card is merely an example of a typical means by which transit data is collected by an operator.

Figure 3:
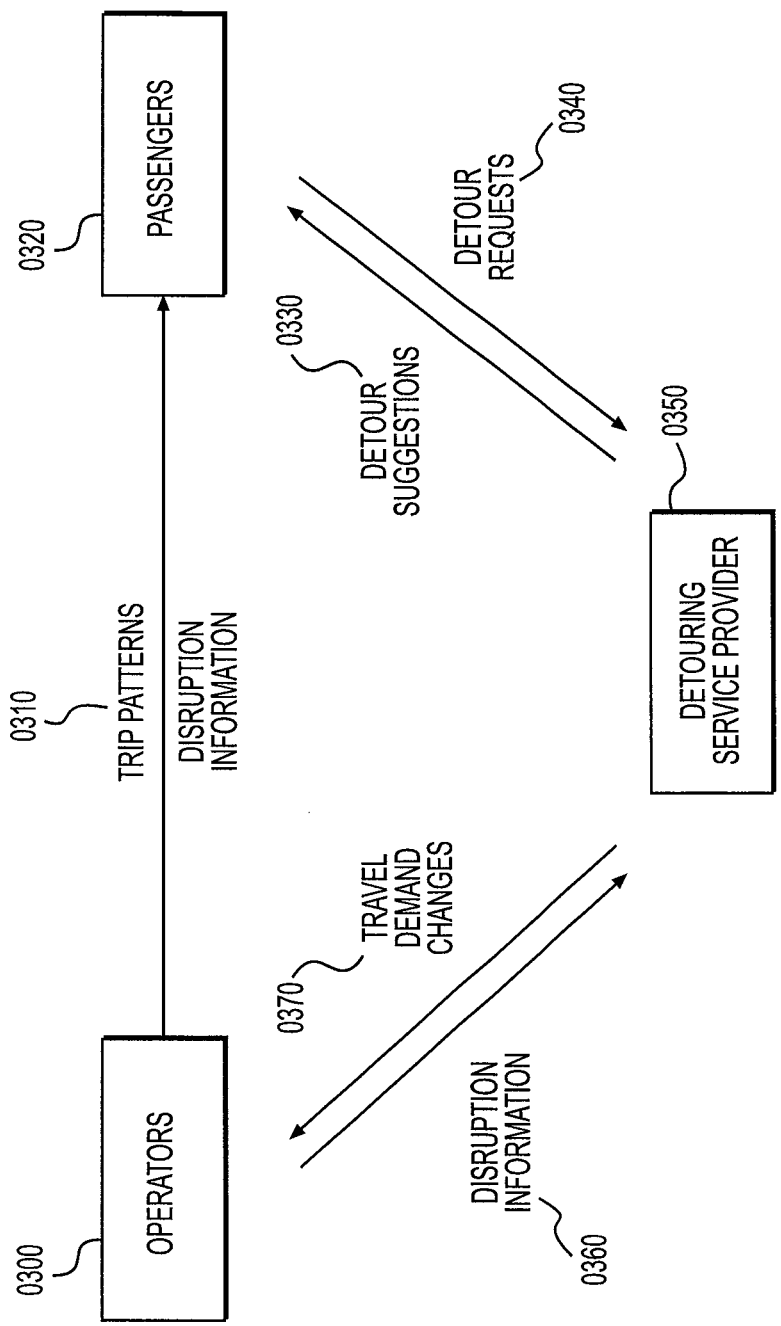
FIG. 3 illustrates the architecture of the passenger detouring system according to the first embodiment of the present invention.

FIG. 3 illustrates the architecture of the passenger detouring system according to the first embodiment of the present invention. The system comprises one or more operators 0300, a plurality of mobile devices representing passengers 0320, and detouring service provider 0350. As mentioned above, operators 0300 operate the public transit services, and they store the transit data 0200 of the passengers 0320 using their services. In addition, the operators 0300 mine their own transit data 0200 to derive trip patterns 0310 for each passenger (explained in more detail below) and send the trip patterns 310 to the corresponding passengers 0320.

The operators also notify passengers 0320 and the detouring service provider 0350 of disruption information 0360 in case of a service disruption.

As shown in FIG. 3, the operators, passengers, and detouring service provider communicate with each other in a manner so as to protect the privacy of the passenger's data and the operators' data. As indicated by the arrows in FIG. 3, pieces of information (i.e., data) are selectively shared between the operators, passengers, and detouring service provider. The operators send trip patterns 310 and disruption information 310 to the mobile devices of the passengers 320. The operators 300 also send disruption information 360 to the detouring service provider 350. Travel demand changes are sent 370 to the operators 300 from the detouring service provider 350. In addition, detour suggestions 330 are sent to the passengers 320 after generated in the detouring service provider 350. At a time prior to receiving disruption information from the operators 300, a passenger 320 sends detour requests 340 to the detouring service provider 350.

As mentioned in more detail below, the passengers 320 use electronic mobile devices capable of computing and sending and receiving data. Throughout the disclosure of the present invention the term "passenger" or "passengers" may be used to refer to the electronic mobile device used by the passenger(s). The passenger's electronic mobile devices, operators, and detouring service provider communicate with each other through one or more networks such as the public Internet, an enterprise intranet, or other wide area or local area network, which are known in the art.

Figure 4:
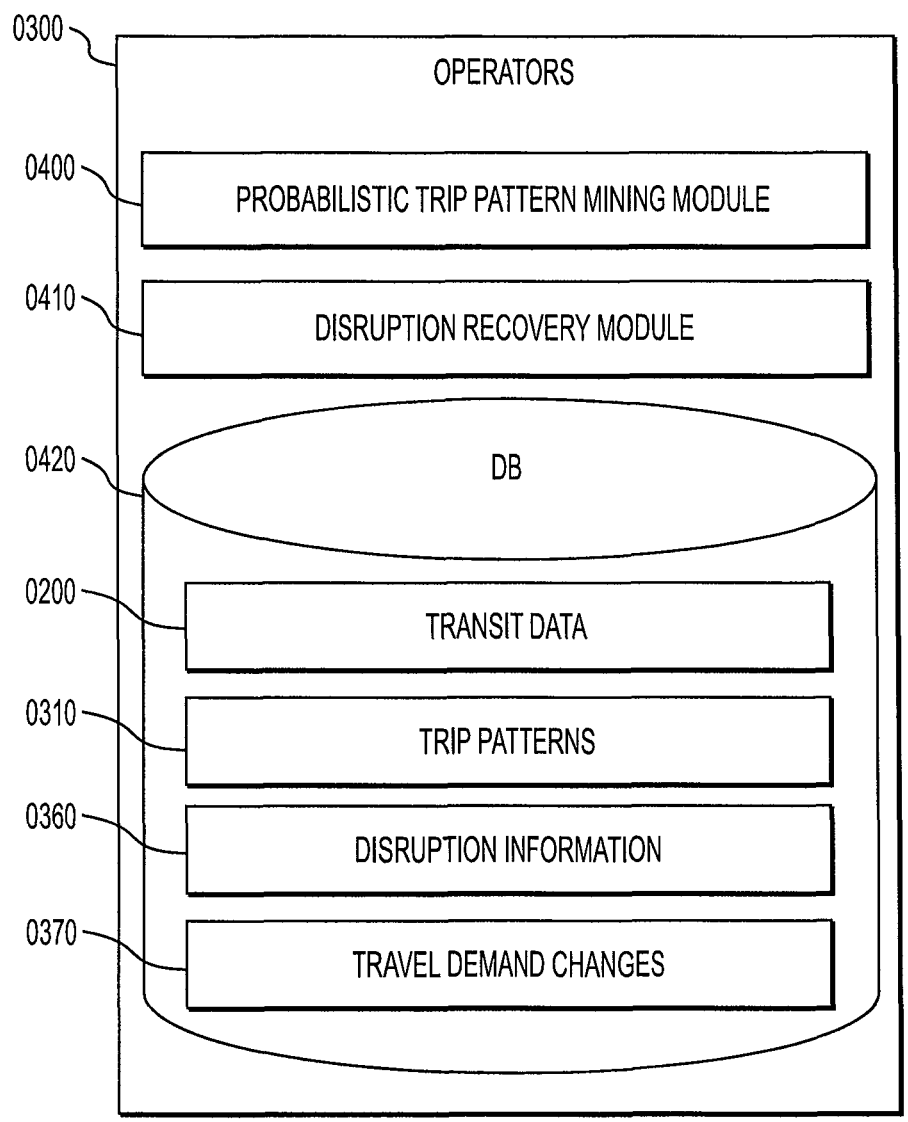
FIG. 4 is a block diagram illustrating the components of an operator according to the first embodiment of the present invention.

FIG. 4 is a block diagram illustrating the components of an operator 0300 according to the first embodiment of the present invention. Although not shown in FIG. 4, each operator includes a computing device (e.g., computer, which includes a central processing unit, memory, etc.), one or more storage devices for storing data, I/O interface(s), and components for connecting to a network which enables communication between the passengers' mobile phones and the detouring service provider. One or more computers, processors or computing devices may constitute a server belonging to each operator. The processes performed by respective modules described herein are performed by the respective computing device of each operator. The processes described herein are stored in a non-transitory computer readable medium within an operator and are executed by the computer.

The probabilistic trip pattern mining module 0400 mines the transit data 0200 to derive the trip patterns 0310. Disruption recovery module 0410 sends disruption information 0360 to the passengers 0320 and detouring service provider 0350, and acquires the travel demand changes 0370. The database 0420 stores transit data 0200, trip patterns 0310, disruption information 0360, and travel demand changes 0370 in the one or more storage devices. The functions and process of the components of the operators is explained below in more detail.

Figure 5:
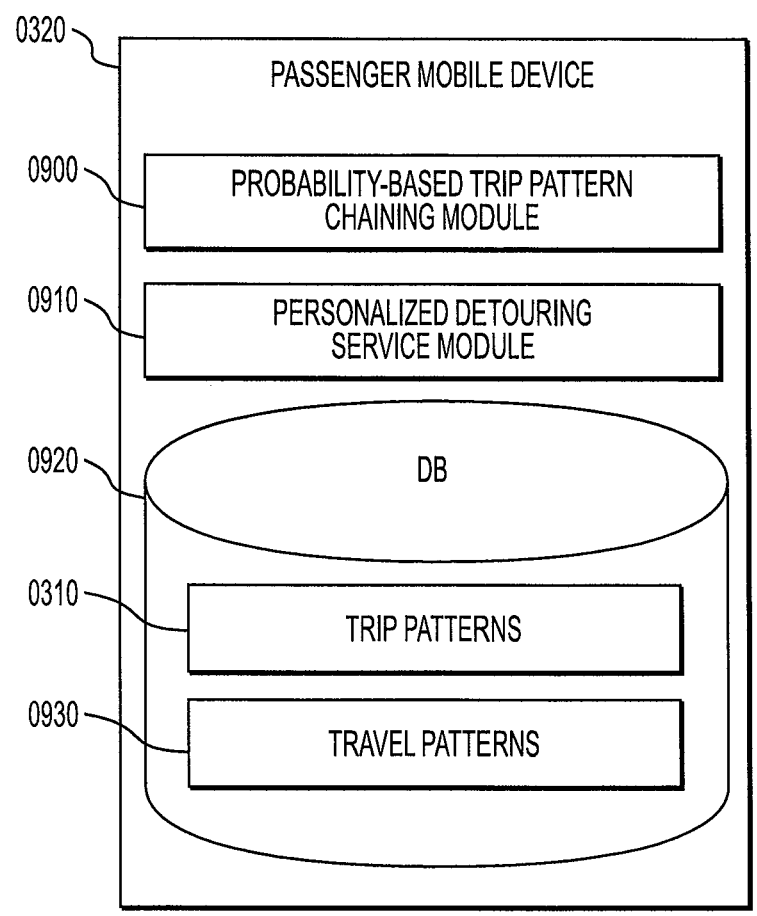
FIG. 5 is a block diagram illustrating the components of an electronic mobile device used by the passengers according to the first embodiment of the present invention.

FIG. 5 is a block diagram illustrating the components of an electronic mobile device used by the passengers according to the first embodiment of the present invention. The mobile electronic device executes applications and programs, which include one or more processes, which are explained in more detail below. The mobile device includes a computer (including a CPU and memory), a display coupled to the computer, and a wireless communications interface (generally internal to the mobile device,) coupled with the computer. The computer includes processor that executes software modules, commonly also known as applications, generally stored as computer program instructions within a main memory of the mobile device.

The mobile phone includes therein one or more processors that are used to run software of the mobile phone as well as communicate voice and data wirelessly to base stations (not shown) as part of a communications network. A variety of different wireless protocols may be used to transmit the data including WiFi, Global System for Mobile Communications (GSM), Cell Division Multiple Access (CDMA), Long-Term Evolution (LTE) and the like. The data is transmitted across a network that may include a proprietary network or an open network such as the Internet. Data may also be communicated using Short Message Service (SMS) protocol.

The mobile device of a passenger executes the application, which is also configured to receive and send data to and from the operators and detouring service provider. Further, a display interface drives a display of the mobile device. Included in the electronic mobile device are the following modules which represent processes performed by the computer of the mobile device. Probability-based trip pattern chaining module 0900 chains the trip patterns 0310 to form travel patterns 0930. Personalized detouring service module 0910 provides proactive and personalized detouring service to the passengers 0320. The database 0920 stores trip patterns 0310 and travel patterns 0930 in a storage device within the mobile device.

Figure 6:
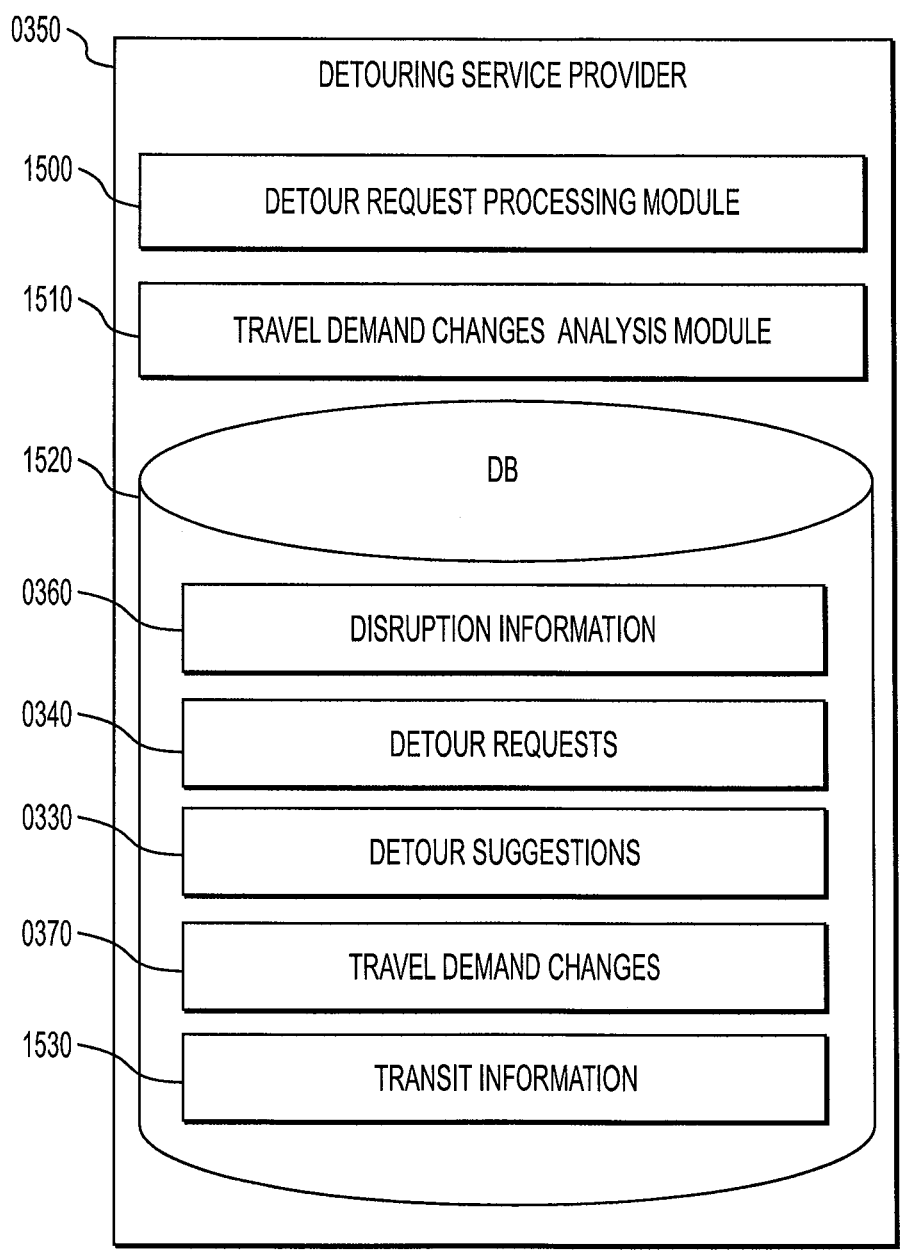
FIG. 6 is a block diagram illustrating the components of a detouring service provider according to the first embodiment of the present invention.

FIG. 6 is a block diagram illustrating the components of a detouring service provider according to the first embodiment of the present invention. Although not shown in FIG. 6, the detouring service provider includes a computer (which includes a central processing unit, memory, etc.), one or more storage devices for storing data, I/O interface(s), and components for connecting to a network enabling communication between the passengers and operators. One or more computers may constitute a server belonging to the detour service provider.

Included in the detouring service provider are the following modules which represent processes performed by a computer of the detour service provider. The processes described herein are stored in a non-transitory computer readable medium within the detouring service provider and are executed by the computer. Detour request processing module 1500 processes the detour requests 0340 from the passengers 0320, and travel demand changes analysis module 1510 derives the travel demand changes 0370 through analyzing the detouring behaviors of affected passengers. The database 1520 stores disruption information 0360, detour requests 0340, detour suggestions 0330, travel demand changes 0370, and transit information 1530 in the one or more storage devices.

Transit information 1530 is information derived from the public transit network that the detouring service provider will use to search for detours at step 1620 of the processes performed by the detour request processing module 1500. The transit information 1530 is a collection of routes and schedule information (itineraries) from multiple operators in a given geographical area (e.g., country, city, town). The transit information 1530 is stored in the database as a searchable and accessible collection of routes so the detouring service provider may refer to the routes to determine detours. From the data stored in the transit information 1530, the schedule of each operator is known. A detour search engine is used to search for detours.

For example, in the transit information 1530, the detouring service provider builds and manages a database of routes and services of operators used in a city, such as bus routes, train routes, trolley routes, etc. The routes of the information are published and are ordinarily accessible by the passengers. The detouring service provider maintains a database of all possible routes provided by the operators. In another example, the detouring service provider acquires the route and service information of all operators from a government authority (e.g., transportation department) which manages such data. The route and service information is pre-loaded, managed, and updated as necessary in the transit information 1530 as the services or routes provided by each operator change. The route information includes at least departing and arriving time information and may include the price for a using a route, travel time range, and an identifier of a service (e.g., bus number or train number). Accordingly, the detouring service provider uses the map 1530 database to search for detours when a passenger sends a detour request. The detouring service provider is aware of all possible routes between locations for all operators using the service and the transit information 1530 is stored in the database as a searchable and accessible collection of routes so the detouring service provider may refer to the routes to determine detours.

Figure 7:
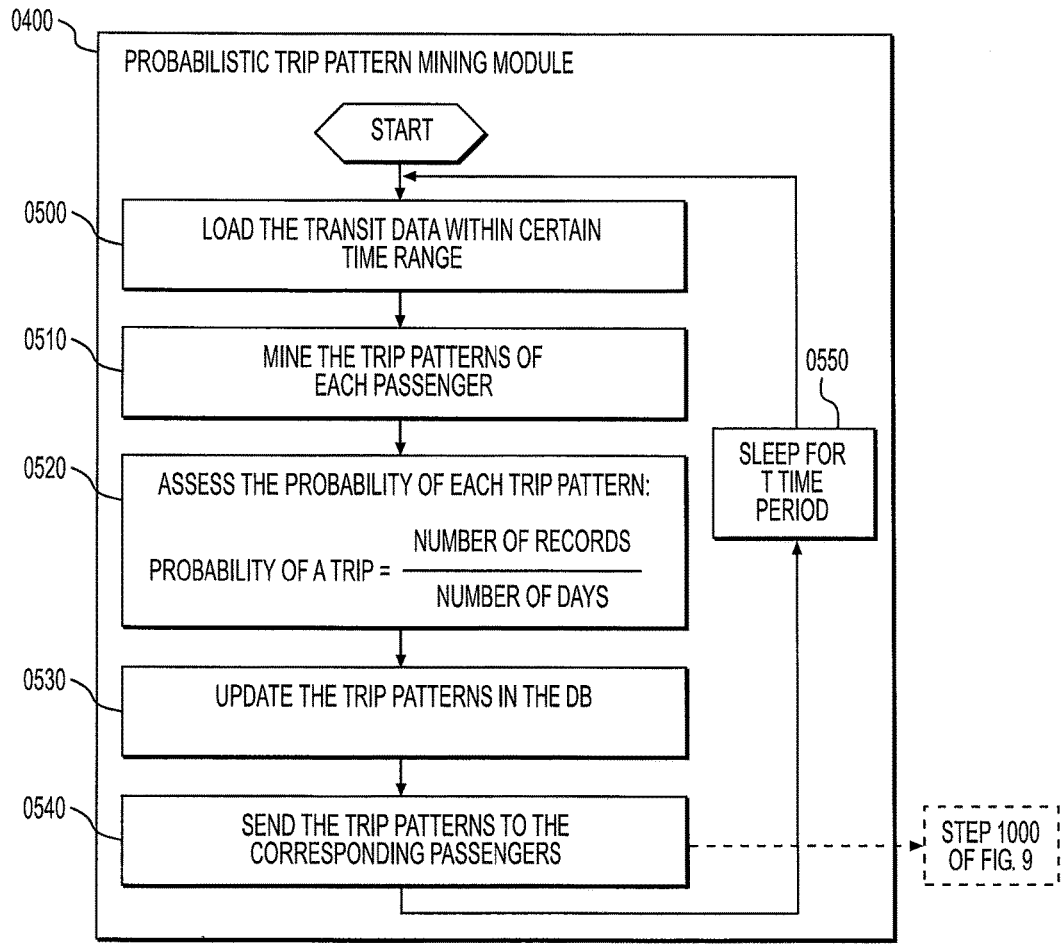
FIG. 7 is a flowchart illustrating processes performed by the probabilistic trip pattern mining module of each operator according to the first embodiment of the present invention.

FIG. 7 is a flowchart illustrating the processes performed by the probabilistic trip pattern mining module 400 of each operator according to the first embodiment of the present invention. In general, the probabilistic pattern mining module 400 preforms processes to generate trip patterns from raw transit data, which are then sent and used by the corresponding passenger's mobile device to develop travel patterns. At step 500 each operator loads the transit data 200 within a particular time range (e.g., 6 months). An example of transit data 200 is shown in FIG. 2. At step 510, trip patterns for each passenger are mined based on the transit data 200. The probabilistic trip pattern mining module 400 uses the transit data 200 to generate trip patterns, which represent individual trips of a journey taken by a passenger using an operator from one location to another. The trip pattern may indicate that the passenger used a service (e.g., train) of an operator to travel from Location 1 to Location 6 along a train line, which necessarily means the passenger traveled through locations 2, 3, 4, and 5 on the train line to arrive at Location 6 from Location 1, if Locations 2, 3, 4, and 5 are between Locations 1 and 6 and on the same train line. If the transit data indicates a passenger used the service Train 1

At step 520 in FIG. 7, the probability of each trip pattern is assessed. The probability of each trip pattern represents the frequency the passenger used a particular trip pattern in a given amount of time. In one embodiment of the present invention, the trip probability of the trip pattern is calculated by diving the number of times the passenger is recorded as taking the trip in a trip pattern by a number of days. By way of example, if the passenger took the trip 9 times in 10 days, the probably of the trip pattern is set to 90%. In another example, if the passenger is recorded as taking a particular trip 5 times in 7 days, the trip pattern is set to 71%. For each trip pattern, the probability is calculated and the trip patterns are updated in the database to include the respective calculated probabilities at step 530.

After an operator completes steps 500-530, the operator sends the trip patterns to the corresponding passengers. The trip patterns may be pushed to the application executed on the mobile device of the passenger or pulled by the application running on the mobile device of the passenger. The trip patterns of each passenger are sent to the respective passenger's mobile device over the internet using a client-server model. A server may run in the operator's infrastructure and the passenger's mobile device may act as a client. This facility may be a value added service that the operators provide to their customers, who are the passengers. The passengers may register to this service by installing a supplied mobile application which serves as a client to the server running in the operator's infrastructure. Subsequently, the probabilistic trip pattern mining module returns to step 500 after a period of time, T, lapses, at step 550.

FIG. 8 illustrates exemplary information of trip patterns 310 according to an embodiment of the present invention. As shown in FIG. 8, a trip pattern 310 has a passenger ID 700, trip ID 710, origin 720, destination 730, time range 740, service 750, and trip probability 760. In an exemplary trip shown in FIG. 8, a passenger having passenger ID 32405 used the service Train 1 to transit from Location 1 to Location 2 from 08:00:00 to 08:40:00. This trip has a trip ID of 001 and a trip probability of 90%, which is calculated in step 520. The passenger ID 700 is identified as above, the origin 720 is taken from the boarding station 220 of the transit data 200, the destination 730 is taken from the alighting station 230 of the transit data 200, and the time range 740 is developed from the boarding date/time 240 and alighting date/time 250 of the transit data 200.

Figure 9:
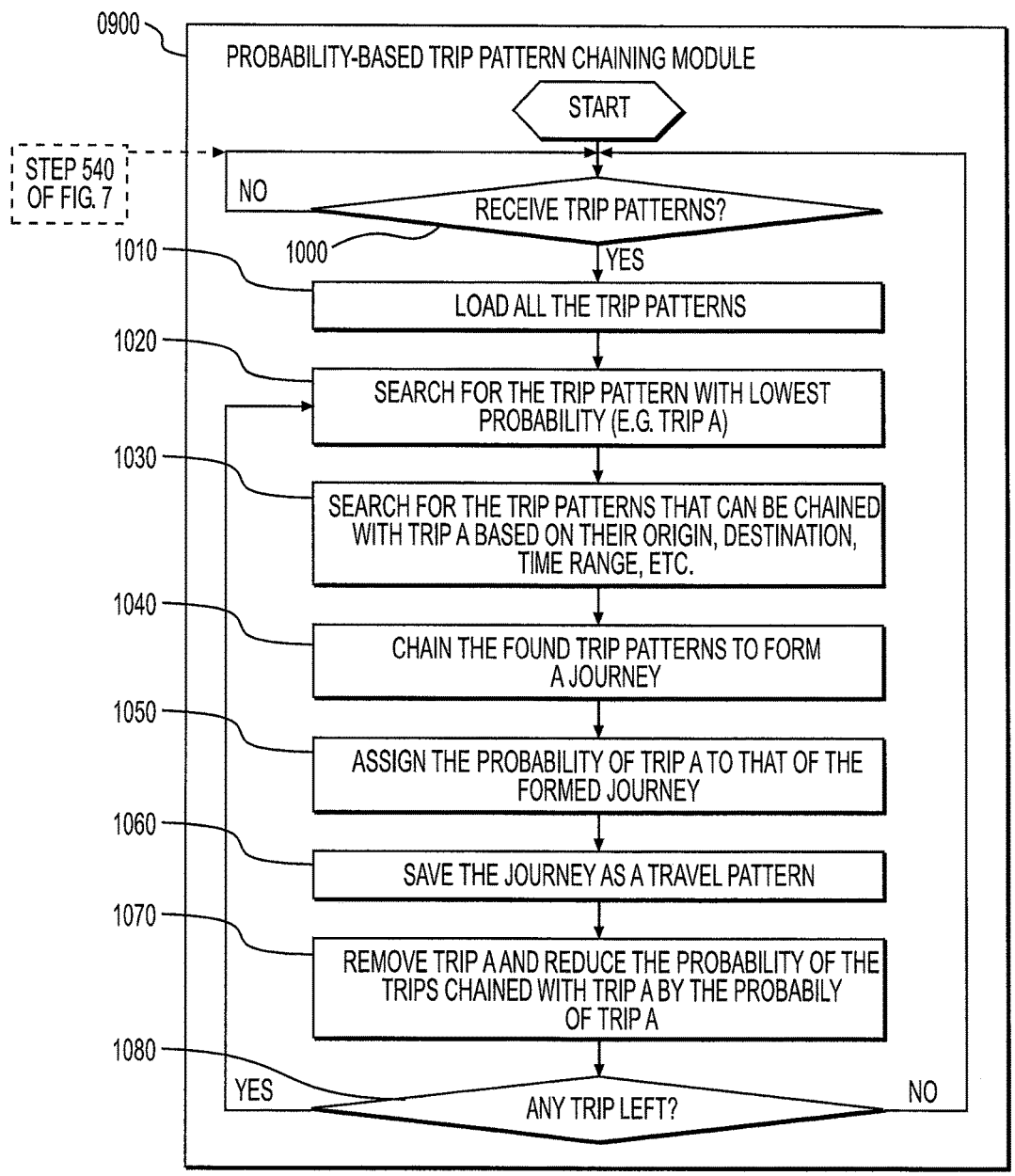
FIG. 9 is a flowchart illustrating processes performed by the probability-based trip pattern chaining module of a passenger's mobile device according to the first embodiment of the present invention.

FIG. 9 is a flowchart illustrating processes performed by the probability-based trip pattern chaining module 900 of a passenger's mobile device according to the first embodiment of the present invention. In general, the pattern chaining module 900 associates received trip patterns to form travel patterns, which are used to determine whether a disruption of a transit service affects the passenger. As used herein, the term "chained" means to associate trip patterns to form a journey, which is saved and stored as a travel pattern.

At step 1000, the process determines whether a trip pattern is received by an operator. If one or more trip patterns are received, the trip patterns are stored in the storage device of the mobile device. At steps 1010, the trip patterns are loaded from the trip patterns stored in the storage device. In one embodiment, only trip patterns within a certain period of time are loaded. At step 1020, the loaded trip patterns are searched for the trip pattern having the lowest probably. For example, if out of the trip patterns loaded in step 1010, Trip A may have the lowest probability among the trip patterns (e.g., 30%).

At step 1030, the trip patterns are searched for any other trip patterns that can be chained with Trip A based on the origin 720, destination 730, and time range 740 of the loaded trip patterns. Origin, destination, and time range are merely examples of pieces of information which can be evaluated to chain trip patterns together to form a journey of a passenger.

FIG. 10 illustrates exemplary information of travel patterns 930 according to an embodiment of the present invention. As shown in FIG. 10, a travel pattern 930 has a journey ID 1200, origin 1210, destination 1220, time range 1230, journey probability 1240, and the trip pattern IDs 1250 that the travel pattern consists of.

For example, journey ID 0002 is a journey of trips having trip IDs 001 and 002 chained together. They are associated by the probability-based trip pattern chaining module for having related origins 720, destinations 730 and/or time range 740. With reference to FIG. 8, trip ID 001 has an origin of Location 1, a destination of Location 2, and time range of 08:00:00 to 08:40:00. Trip ID 002, has an origin of Location 2, a destination of Location 3, and time range of 08:40:00-09:10:00. Accordingly, trip patterns having trip IDs 001 and 002 are chained since at least trip pattern 002 has an origin corresponding to trip pattern 001's destination. In addition, the time ranges 740 are identified as being associated since the end time of trip ID 001 is the begin time of trip ID 002. However, the time ranges 740 do not have to match exactly for the probability-based trip pattern chaining module to determine there is an association. In one embodiment, trip patterns having time periods within a predetermined threshold time window are determined to be associated. Accordingly, the journey having journey ID 0002 is two trip patterns chained together (having trip IDs 001 and 002), to form a journey. It is also noted that trip patterns from one or more operators may be chained to form a journey, which subsequently forms a travel pattern.

At step 1040, the found trip patterns are chained to form journeys and the journeys are subsequently stored in the database as travel patterns. At step 1050, the trip probability 760 of Trip A is assigned to the journey formed in step 1040. Subsequently, at step 1060, the journey is stored in the database as a travel pattern, which now has the probability value assigned in step 1050. Then at step 1070, Trip A is removed from the trip patterns loaded in step 1010 and each of the trip patterns in the loaded trip patterns that were chained with Trip A is reduced by the trip probability 760 value of Trip A. Accordingly, if a travel pattern is generated by associating trips patterns having trip IDs 001, 002, and 003 to form a travel pattern having a journey ID of 0001 (as in FIG. 10), then the travel pattern has a journey probability of 30%. Then, according to step 1070, trip patterns having IDs 001 and 002, which are loaded (i.e., only Trip A (ID 003) is removed) are reduced by 30%, which is the trip probability 760 value of Trip A, and saved. As a result, trip pattern with ID 001 is reduced to 60% from 90% and trip pattern with ID 002 is reduced to 30% from 60%.

Step 1080 assesses whether there are any trips left of the trip patterns loaded in step 1010. If yes, then processing returns to step 1020 to process the remaining trip patterns as described, which have a new probability based on the processing of step 1070. If no, then processing returns to step 1000 to assesses whether any trip patterns have been received from any operators.

Figure 11:
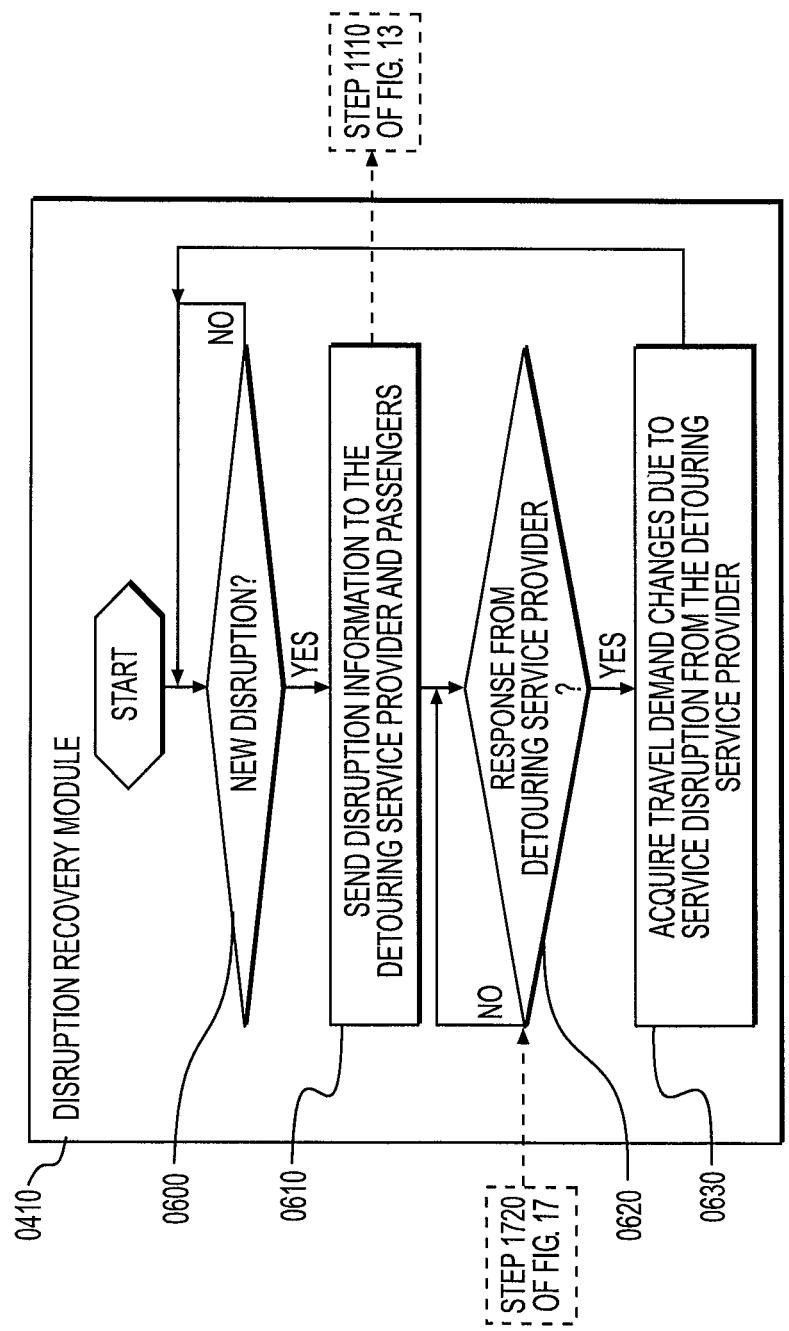
FIG. 11 is a flowchart illustrating processes performed by the disruption recovery module of each operator according to the first embodiment of the present invention.

FIG. 11 is a flowchart illustrating processes performed by the disruption recovery module 410 of each operator according to the first embodiment of the present invention. In general, the disruption recovery module 410 sends disruption information 360 to affected passengers and the detouring service provider, waits for a response from the detouring service provider, and acquires travel demand changes 370 due to the service disruption from the detouring service provider. When a new disruption is detected at step 600, the disruption information 360 is sent to the detouring service provider to be stored in the database 1520 and the passengers (mobile device of passenger) at step 610 via a network. The operators provide the data included in the disruption information 360 and the disruption information 360 is sent to all passengers. The process waits until, at step 620, the disruption recovery module 410 receives a response from the detouring service provider. Then, at step 630, the disruption recovery module 410 acquires travel demand changes 370 due to the service disruption from the detouring service provider, which is explained in more detail below and with respect to FIGS. 17 and 18.

The travel demand increase at a particular operator is an estimation provided by the detouring service provider and is useful to the operator for determining whether there's an increase or decrease in the number of passengers using its services. For example, when an operator is notified that there is a travel demand increase, the operator may react to the information by arranging alternative transportation for their passengers in the form of extra busses, taxis etc.

FIG. 12 illustrates exemplary information of disruption information 360 sent by an operator to the passenger's mobile devices and detouring service provider according to the first embodiment of the present invention. As shown in FIG. 12, the disruption information 360 includes disruption ID 800 uniquely identifying the disruption, service 810 identifying which service of the operator is disrupted, starting location 820 identifying a starting point where the service is disrupted, an ending station 830 identifying an ending point where the service is disrupted, a starting time 840 indicating the time at which the service is disrupted, and a service resume time 850 indicating an estimated time that the service will resume. Accordingly, in this example, service of Train 1 at Locations 1, Locations 2, Locations 3, and Locations 4 are interrupted by the disruption event. In this example it is assumed that Locations 2 and 3 are between Locations 1 and 4 on the same train line or route. The disruption starting time is May 16, 2013 at 08:40:00 and it is estimated that Train 1 will resume service at those locations on May 16, 2013 at 11:50:00. Although this is not a limitation or requirement, the disruption information may be displayed on the mobile device.

Figure 13:
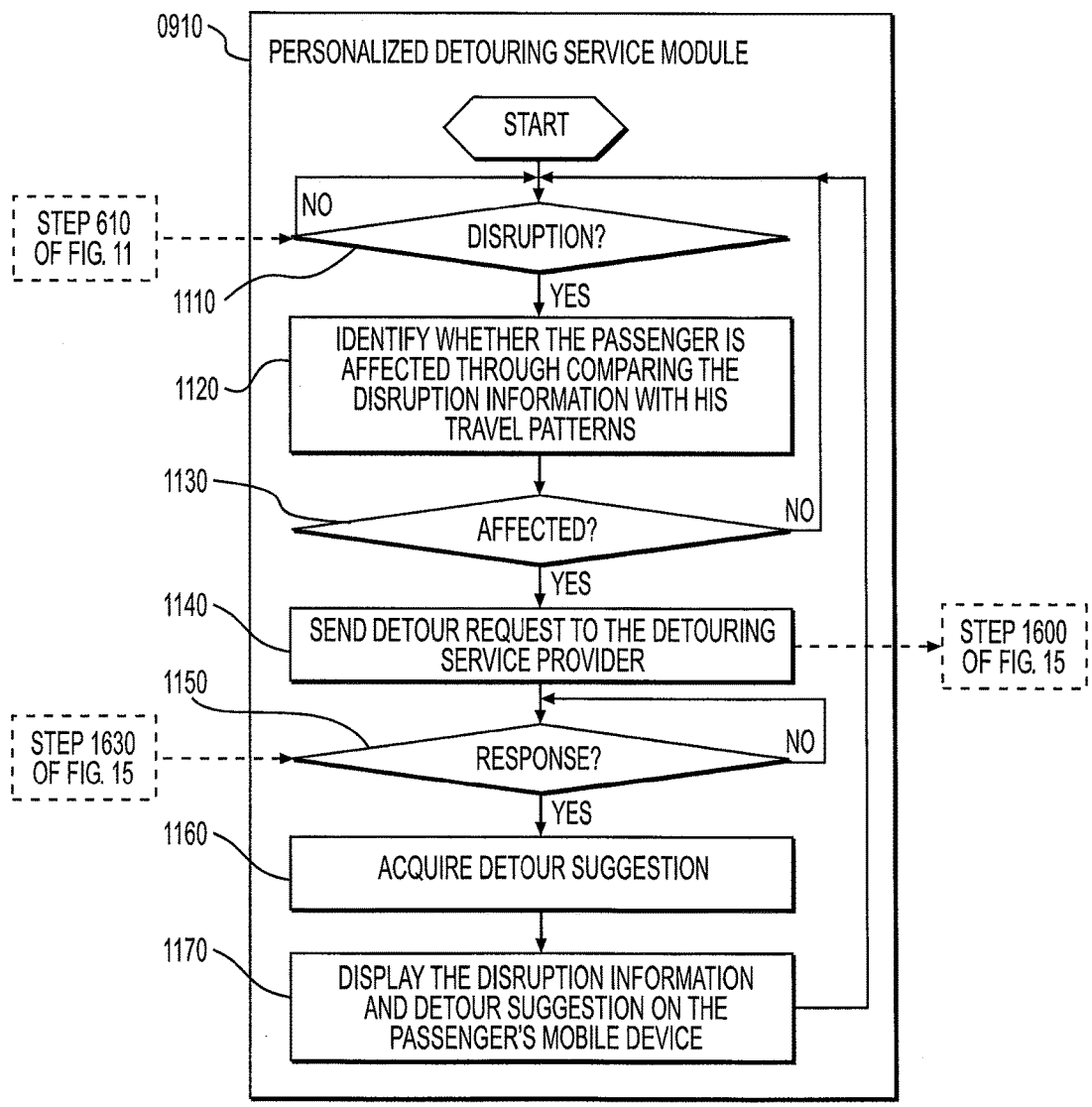
FIG. 13 is a flowchart illustrating processes performed by the personalized detouring service module of passenger's a mobile device according to the first embodiment of the present invention.

FIG. 13 is a flowchart illustrating processes performed by the personalized detouring service module 910 of passenger's a mobile device according to the first embodiment of the present invention. At step 1110, the personalized detouring service module 910 evaluates whether disruption information is received from an operator (step 610 of FIG. 13). If no, then the process waits for disruption information 360 to be received. If yes, then processing proceeds to step 1120 to determine whether the passenger is affected by comparing the disruption information 360 with the travel patterns stored in the database. For a given day, by evaluating the journey probability 1240 of each travel pattern 930 the personalized detouring service module 910 can determine how likely it is that the passenger will use a given travel pattern. Alternatively, the travel patterns may not be organized by day, instead the trip patterns may be searched in order of the probability value regardless of the day of the disruption. Further, all travel patterns stored in the database may be evaluated regardless of the probably value of the trip pattern or the given day the disruption occurred.

By searching the travel patterns having a high probability first for the given day, the trip patterns of the travel pattern can be identified by the trip ID 1250. Once the trip ID is identified, the disruption information 360 can be compared to the trip pattern of the trip ID to determine whether the passenger is affected by the disruption. One or more trip patterns included in the travel pattern may be affected by the disruption and therefore the passenger may need a detour for that trip pattern of the affected travel pattern.

According to this processing, if the application receives disruption information 360 notifying the application of a disruption, the personalized detouring service module can predict, based on the probability of the travel patterns of the passenger on a given day, whether the passenger will need a detour. If a travel pattern is affected by the detouring information, then the personalized detouring service module 910 determines that the passenger is affected. In one embodiment, a threshold may be set (e.g., 30%) so that if disruption information is received, the personalized detouring service module 910 can identify, at step 1120, whether there are any travel patterns affected by the disruption based on the comparison of the disruption information and the travel patterns, that have a probability greater than or equal to 30% and if so, it is determined the passenger is affected and a detour request will be created and sent (step 1140).

In another embodiment of the present invention, a comparison between the disruption information 360 and the travel pattern can be made with respect to the starting time 840 of the disruption information and the beginning time of the time range 1230 of a travel pattern. If the starting time 840 of the disruption information is within a predetermined time period (e.g., 45 minutes) of the beginning of the time range 1230 of a travel pattern and an origin or a destination is included within the span of the starting location and ending location of the disruption information 360, then the travel pattern can be identified as affected.

Taking the exemplary disruption information of FIG. 12, step 1120 of FIG. 13 compares the starting station 820, ending station 830, the starting time 840, and service resume time 850 and compares the information with the information of the identified travel patterns (which were created as shown in FIG. 9). For example, if a travel pattern of the passenger indicates that the passenger uses a station included within the span of the starting station 820 and the ending station 830 during the period of time from the starting time 840 and the service resume time 850, the travel pattern is identified to be affected by the disruption, at step 1130. Therefore, the one or more trip patterns included in the identified travel pattern are evaluated to identify which individual trip patterns are affected. At step 1140, after the affected trip patterns are identified, the detour request can be generated.

In a practical example, on a Monday, the probability of the travel patterns indicate that there is a relative high likelihood that the passenger uses a given travel pattern on Mondays beginning at 08:00:00 starting at Location 1. If on a Monday, disruption information is received that has a starting time 840 of 07:30:00 and has the same starting location 820 as that of an origin 720 (e.g., Location 1) of a travel pattern, the passenger is determined to be affected and the travel pattern is identified. The passenger is determined to be affected based on having a high probability that the passenger takes the identified travel pattern that day (e.g., Monday) and the starting time (e.g., 07:30:00) is within the predetermined time period (e.g., 45 minutes).

Figure 14:
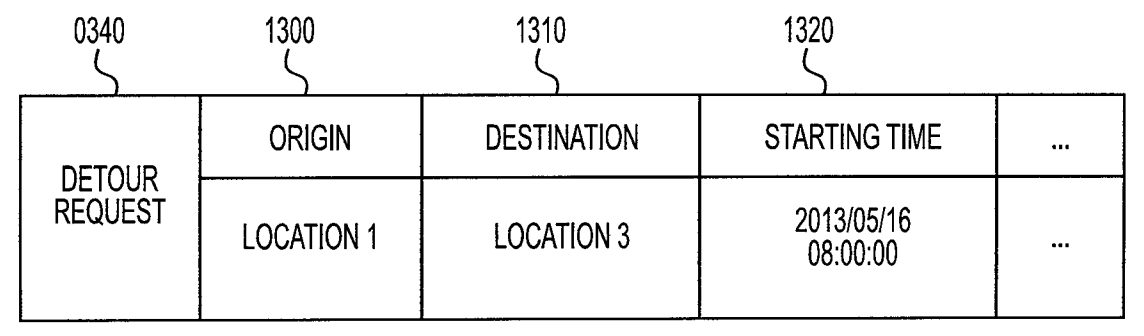

FIG. 14 illustrates exemplary information of a detour request 340 generated by the personalized detouring service module 910 of a passenger's mobile device according to the first embodiment of the present invention. Detour request 340 includes an origin 1300 indicating the location where the passenger needs a detour from and destination 1310 indicating the location where the passenger needs a detour to. The detour request also includes a starting time 1320. Accordingly, in the exemplary detour request of FIG. 14, the passenger needs a detour from Location 1 to Location 3 at 08:00:00 on May 5, 2013. Of course, the detour request may include less or more information than is shown and described. It is noted that no personal information of the passenger is provided to the detouring service provider in the detour request.

The origin 1300 of the detour request is generated by evaluating the trip patterns identified as affected in step 1120. The origin and destinations of the affected trip patterns are used as the origin and destination of the detour request. Further, the starting time is the beginning time of the time range of the affected trip pattern. Alternatively, the passenger may manually input information into the detour request fields (e.g., input an origin, destination, or starting time) using a guided user interface (GUI). In the case the passenger manually inputs the information, the GUI may be displayed after step 1130 and before step 1140 of FIG. 13. In addition, in manual case, the in-mobile application notification may display a list of all probable travel patterns for a day (with affected trips within them) before the detour request is sent. The passenger may select a specific travel pattern that the passenger actually intends to travel on that specific day. The detour request may be sent only for the affected trips within the selected travel pattern. The passenger will wait for the response from the detour server and obtain the detour suggestion.

At step 1140 the created detour request 340 is sent to the detouring service provider. Then, processing waits at step 1150 for a response from the detouring service provider. The response from the detouring service provider includes a detour suggestion 330 (explained in more detail below), which is acquired at step 1160. Subsequently, at step 1170, the detour suggestion 330 is displayed to the passenger on the passenger's mobile device. For each of the trip patterns, after requesting a detour from the detour service provider, an in-mobile application notification may be displayed with all probable travel patterns at that time with a detour suggestion for each affected trip pattern within each travel pattern. The passenger may choose a specific travel pattern that the passenger actual intends to travel on that specific day and hence be aware of the detour(s) the passenger can take in a travel pattern.

Figure 15:
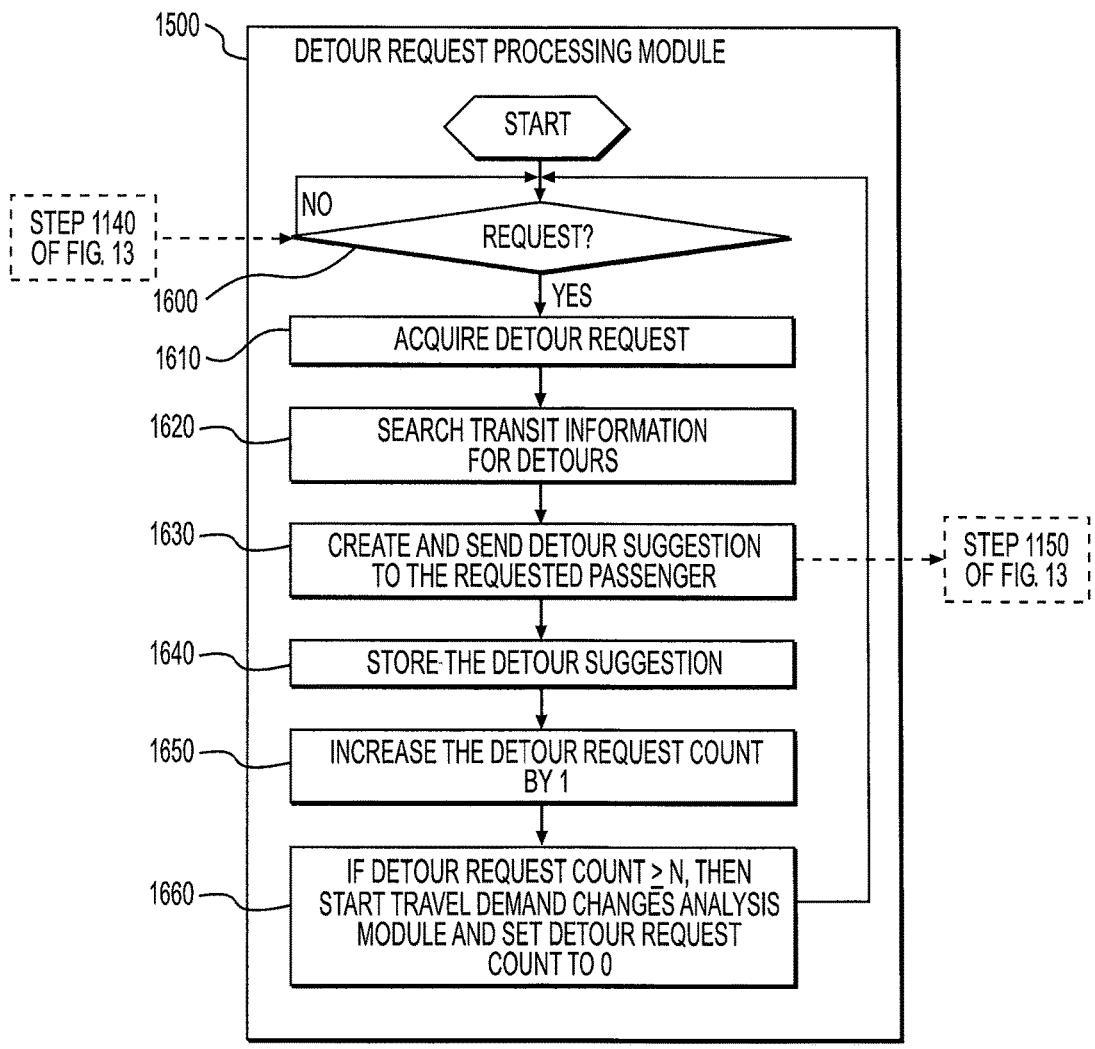
FIG. 15 is a flowchart illustrating processes performed by the detour request processing module of the detouring service provider according to the first embodiment of the present invention.

FIG. 15 is a flowchart illustrating processes performed by the detour request processing module 1500 of the detouring service provider according to the first embodiment of the present invention. At step 1600 the processes determines whether a detour request is received. If no, the process waits for a detour request 340 to be received. If yes, processing proceeds to step 1610 to acquire and store the detour request 340 and process the information contained therein to develop criteria for searching transit information 1530 in the database 1520. At step 1620 the transit information 1530 stored in the database 1520 of the detouring service provider is searched to find a detour for the passenger based on the detour request 340 information.

As mentioned above, the transit information 1530 consists of scheduling and service information of a plurality of operators. The information in the detour request (e.g., origin 1300, destination 1310, and staring time 1320) is used as search criteria for searching the data (schedules, routes, etc.) in the transit information 1530. Based on the criteria, the detour request processing module 1500 may identify one or more operators that satisfy the criteria of the detour request. Based on the exemplary detour request 340, the detour request processing module 1500 is searching the transit information 1530 for one or more operators that have a service from Location 1 to Location 3 starting at 08:00:00 or within a predetermined period of time before or after the starting time 1320.

The detour request processing module 1500 may identify more than one operator that satisfies the criteria and may return different operators that satisfy the criteria of providing a detour between an origin 1300 and a destination 1310 via more than one location. For example, if the detour request 340 information indicates that the passenger needs a detour from location 1 to location 3 and location 2 is between location 1 and location 3, step 1620 may return a bus departing location 1 and arriving at location 2 and a train departing location 2 and arriving at location 3, thereby satisfying the criteria of the detour request of the passenger. The bus and train services may be of different operators or the same operator. Further, the detour request processing module 1500 may identify operators that have services within a predetermined distance from the origin or destination of the detour request.

In one embodiment, once possible detours are identified in step 1620, they are checked against the disruption information 360 stored in the database of the detouring service provider to determine whether the detour routes are currently disrupted or not. If an identified detour is currently disrupted, the detour is removed from the identified detours and not sent as a detour suggestion. As mentioned above, the detouring service provider has all possible routes in its database 1520 including the disrupted line identified in the disruption information. When a mobile device of a passenger requests a detour from a source to a destination, the detouring service provider knows of the disrupted line. This prevents the process that runs on the detouring service engine from sending a route involving a disrupted line.

Subsequently, at step 1630 a detour suggestion 330 is created (generated) based on the detour routes identified in step 1620. FIG. 16 is an exemplary detour suggestion 330 created by the detour request processing module 1500 of the detouring service provider according to the first embodiment of the present invention. As shown in FIG. 16 a detour suggestion 330 includes route information 1400, travel time 1410, and cost of the suggested route 1420, which are generated based on the detours identified from the search performed in step 1620. The route information, travel time, and cost, is identified from the search results and is inserted into the detour suggestion 330. Of course, the detour suggestion 330 can include more or less information than is described and the detour suggestion may contain one or more of the identified detour routes. The detour request processing module 1500 may create (generate) more than one detour suggestion 330 for a received detour request. The route information contains information sufficient for the passenger to be able to identify the operator and service of the detour. The route information may also include a departing time of the service. In the exemplary detour suggestion 330 of FIG. 16, the route information is taking a bus of which the service is Bus 21 to Location 1 and a train of which the service is Train 1 to Location 2. The travel time is 45 minutes and the cost is $1.20.

In addition, at step 1630, the detour suggestion 330 is sent to the passenger's mobile device that sent the detour request. At step 1640, the detour suggestion is stored in the database. At step 1650, a detour request count is increased by one and at step 1660, if the detour request count is greater than or equal to a predetermined threshold value, N, then the travel demand changes analysis module is started and the detour request count is set to zero. After step 1660, processing returns to step 1600 to wait for another detour request.

Figure 17:
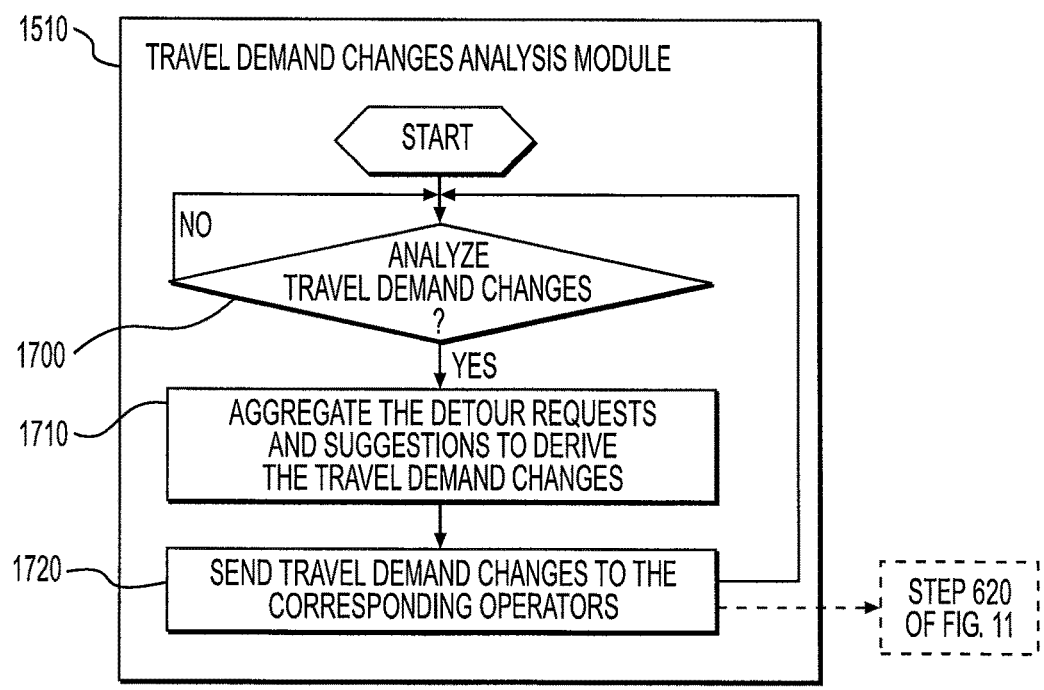
FIG. 17 is a flowchart illustrating processes performed by the travel demand changes analysis module of the detouring service provider according to the first embodiment of the present invention.

FIG. 17 is a flowchart illustrating processes performed by the travel demand changes analysis module 1510 of the detouring service provider according to the first embodiment of the present invention. At step 1700, the travel demand changes analysis module 1510 determines whether it was started by the detour request processing module 1500. If no, the module waits until it's started. If yes, processing continues to step 1710 to aggregate the detour requests 340 and detour suggestions 330 to determine the travel demand changes corresponding to a disruption.

FIG. 18 illustrates exemplary information of travel demand changes 370 generated by the travel demand changes analysis module 1510 of the detouring service provider according to the first embodiment of the present invention. As shown in FIG. 18, the travel demand change 370 has a service indicating which service the travel demand change refers to, changes 1810 indicating a change in passenger volume, stations 1820 indicating which stations the travel demand changes refer to, time range 1830 indicating the time period the travel demand changes refer to, and disruption ID 1840 indicating the disruption information the travel demand changes corresponds.

So, for an operator, the travel demand changes 370 information indicates demand changes in number of people 1810 (e.g., increase in 400 passengers), for a given service 1800 (e.g., Train 1) for one or more stations 1820 (e.g., Locations 1 through Location 4) at a certain time 1830 (e.g., between 08:00:00 and 10:10:00) and the travel demand changes corresponds to a certain disruption 1840 (e.g., disruption information having disruption ID 0021).

In step 1710, to calculate the change in the number of passengers, the travel demand changes module 1510 aggregates the number of detour requests for locations in the origin and destination fields of the detour request 340 information and the number of detour suggestions for locations in the route information 1400. A detour request is represented as a decrease in one passenger, while a detour suggestion represents an increase in one passenger. Accordingly, the aggregation of the detour requests and the detour suggestions result in a numerical value of the travel demand change in the number of passengers 1810 for a given service 1800, at given locations (stations) 1820 during a given time range 1830. Once the travel demand changes are calculated, they are sent to the corresponding operator. As a result, each operator knows the demand change and can adjust their plan according by increasing or decreasing transportation resources at affected locations, for example. The operator that the travel demand changes is to be sent to is known from the disruption information stored in the database, which is identified by the disruption ID 1840 of the travel demand changes 370.

Second Embodiment

The second embodiment of the present invention is illustrated and described with the following figures and the following description. The description will mainly focus on the differences from the first embodiment.

The first embodiment utilizes the passengers' mobile devices to provide detouring services. In the first embodiment, disruption information 0360 and personalized detour suggestions 0330 is sent to the affected passengers' mobile devices. In the second embodiment, an in-station detouring service 1900 is disclosed. This system displays detours to the top destinations of stranded passengers on the in-station electronic display devices at locations, which may be a LED display, plasma display, or the like. This system is useful for passengers that do not have access to the services described in the first embodiment 1, e.g., passengers that do not have electronic mobile devices. It is an object of the second embodiment of the present invention to identify the top destinations of the passengers that need a detour and identify one or more detour routes for each identified top destination and display the same.

Figure 19:
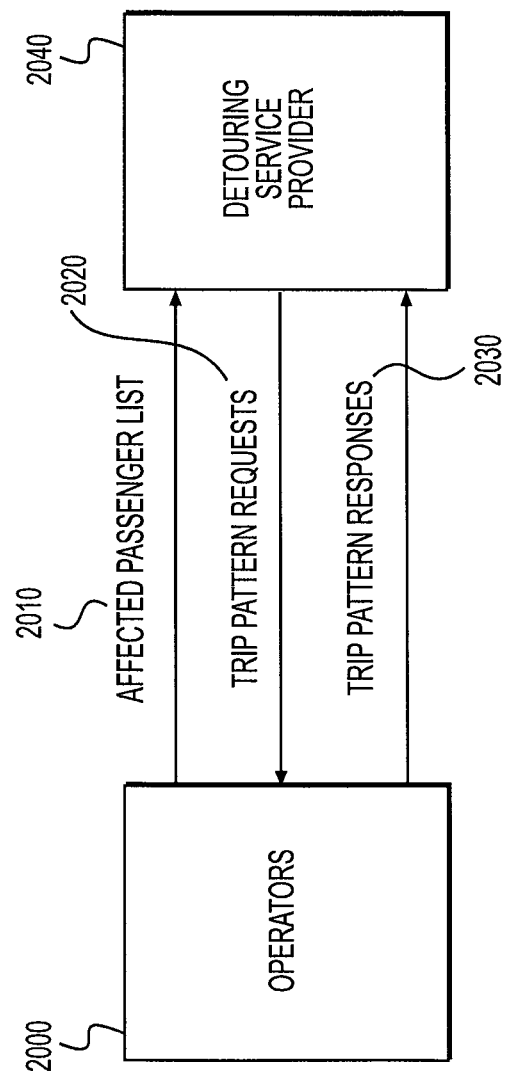
FIG. 19 is a diagram illustrating the architecture of the passenger detouring system according to the second embodiment of the present invention.

FIG. 19 is a diagram illustrating the architecture of the passenger detouring system according to the second embodiment of the present invention. The system includes one or more operators 2000 and a detouring service provider 2040. In general, operators 2000 send an affected passengers list 2010 to the detouring service provider 2040 if a service is disrupted. Trip pattern requests 2020 and trip pattern responses 2030 are used to identify the journey destinations of the affected passengers.

Figure 20:
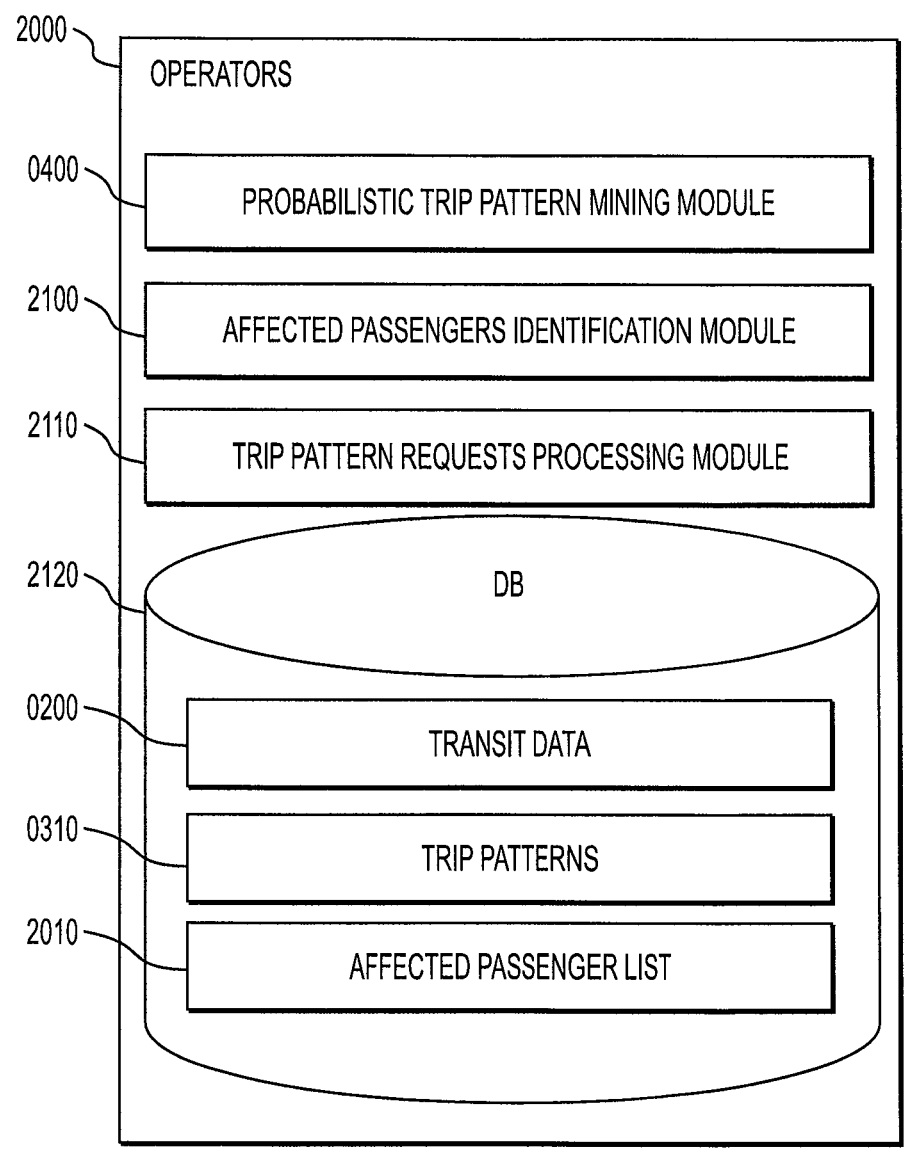
FIG. 20 is a block diagram illustrating the components of an operator according to the second embodiment of the present invention.

FIG. 20 is a block diagram illustrating the components of an operator according to the second embodiment of the present invention. Each operator includes a probabilistic trip pattern mining module 0400 that mines trip patterns 0310, an affected passengers identification module 2100 that identifies passengers that are affected by a disruption based on their trip patterns 0310, a trip pattern requests processing module 2110 processes the trip pattern requests 2020 from the detouring service provider 2040 and sends back trip pattern responses 2030. The database 2120 stores transit data 0200, trip patterns 0310, and affected passenger lists 2010 in one or more storage devices.

Figure 21:
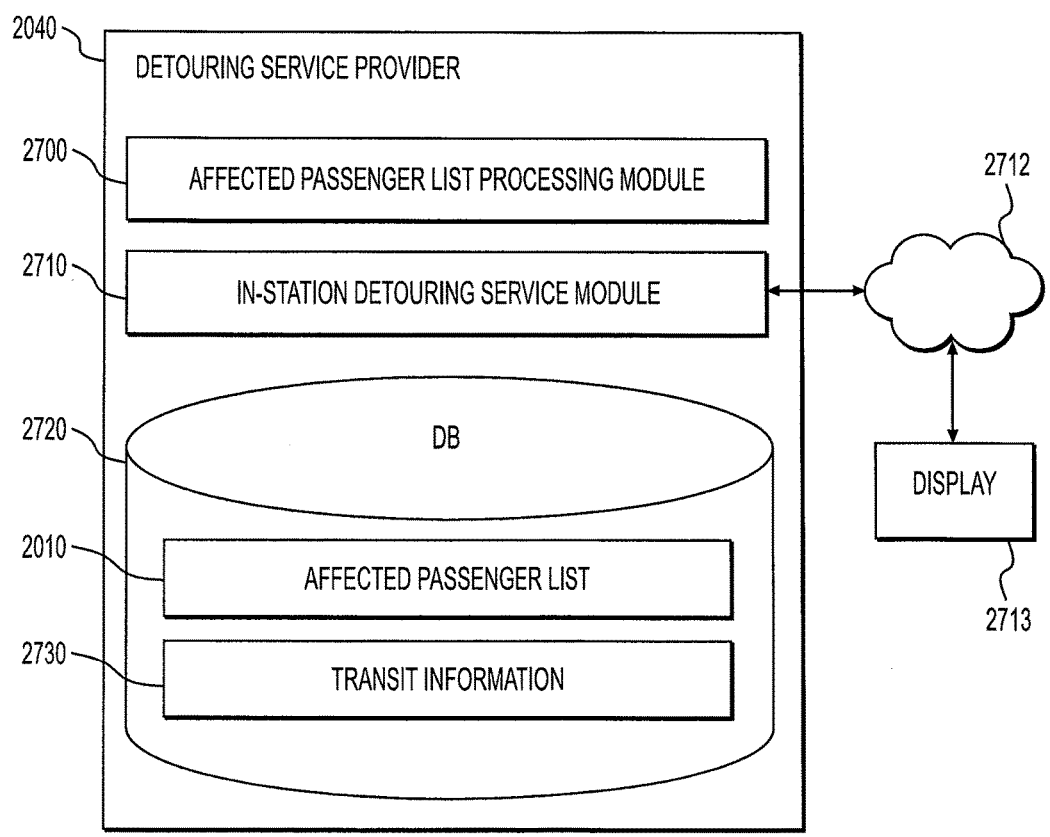
FIG. 21 is a block diagram illustrating the components of a detouring service provider according to the second embodiment of the present invention.

FIG. 21 is a block diagram illustrating the components of a detouring service provider according to the second embodiment of the present invention. The detouring service provider includes an affected passenger list processing module 2700 that processes the affected passenger list 2010 and identifies the journey destinations of each affected passenger. In-station detouring service module 2710 identifies the top destinations 1910, search detours 1920, and sends data to display them via a network 2712 on one or more in-station displays 2713. The database 2720 stores affected passenger list 2010 and transit information 2730. Transit information 2730 is the same as transit information 1530 as explained above, which is used to search for detours.

Figure 22:
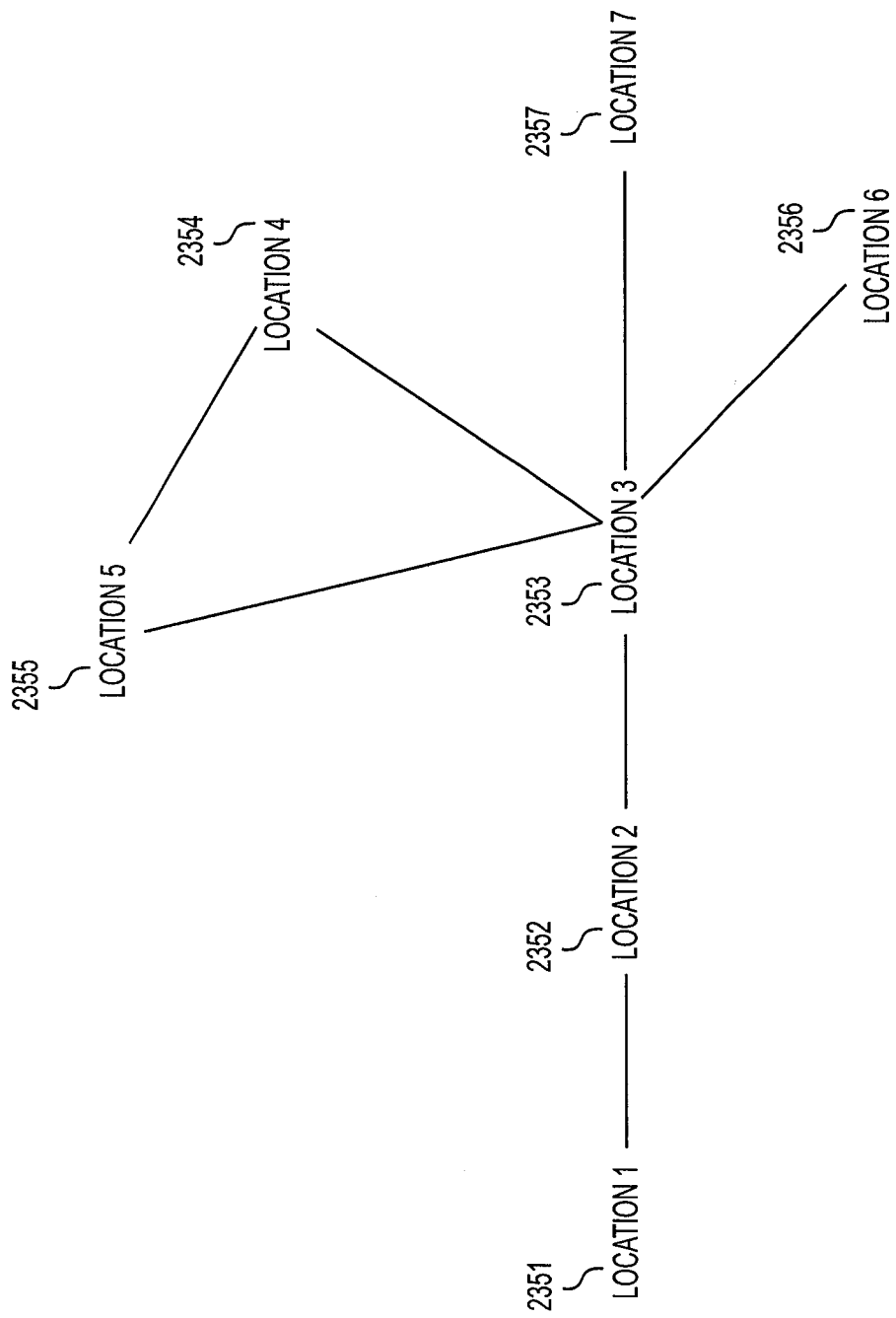
FIG. 22 is a diagram illustrating an exemplary map of operators operating services between different locations according to the second embodiment of the present invention.

FIG. 22 is a diagram illustrating an exemplary map of operators (operator 1, operator 2, operator 3, and operator 4) operating services between different locations (Location 1, Location 2, Location 3, Location 4, Location 5, Location 6, and Location 7) according to the second embodiment of the present invention. For purposes of explanation, operator 1 has a train service operating between locations Locations 1 and Location 7 and including Location 2 and Location 3. The lines labeled "operator 1" indicates the train line, which has 4 locations in this example. An operator operates bus services between respective locations (e.g., Location 3 and Location 5). The exemplary map of operators shown in FIG. 22 will be referred to in the description provided below.

Figure 23:
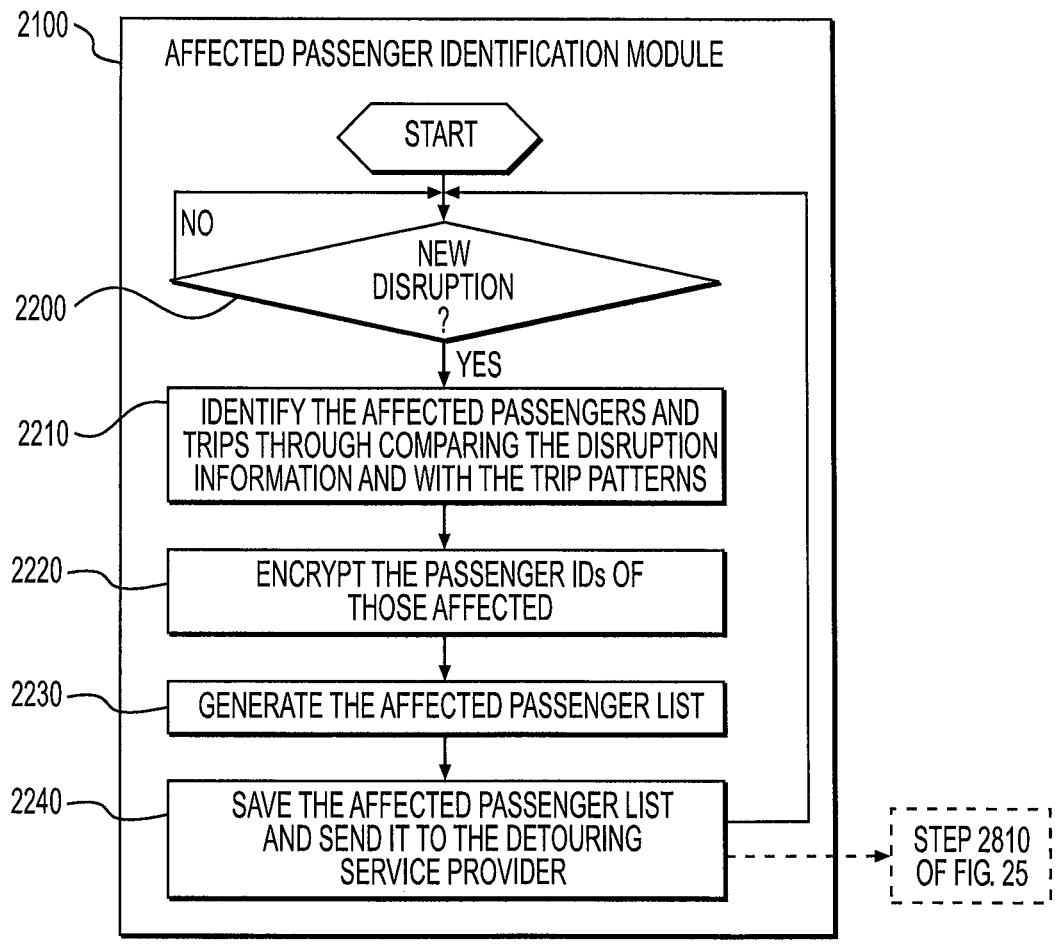
FIG. 23 is a flowchart illustrating processes performed by the affected passenger identification module of an operator according to the second embodiment of the present invention.

FIG. 23 is a flowchart illustrating processes performed by the affected passenger identification module 2100 of an operator according to the second embodiment of the present invention. If a disruption is detected at step 2200, processing proceeds to step 2210. If a disruption is not detected at step 2200, the affected passenger processing module waits for a disruption. When a disruption of a service of the operator occurs, the operator generates disruption information 360 in the same manner as the disruption recovery module 410 described in the first embodiment. At step 2210, the affected passenger identification module 2100 identifies passengers affected by the disruption by comparing the disruption information 360 with the trip patterns stored in the database. As mentioned above, the disruption information 360 includes fields such as service 810, starting location 820, ending station 830, starting time 840, and service resume time 850. A passenger is determined to be affected by a disruption if a trip pattern has an origin or a destination that corresponds to the locations between or inclusive of the starting station and ending station and has a time range that overlaps with or the beginning time or end time of the time is within a predetermined period of time of the starting time.

Once the affected passengers are identified in step 2210, the passenger IDs of the affected passengers are encrypted using encryption technology known in the art, at step 2220. Subsequently, the affected passenger list 2010 is generated, stored, and sent to the detouring service provider, at steps 2230 and 2240, respectively.

FIG. 24 illustrates exemplary information of an affected passenger list 2010 generated by the affected passenger identification module 2100 of an operator according to the second embodiment of the present invention. As shown, the affected passenger list 2010 contains an encrypted passenger ID 2300, a destination 2310, an arrival time 2320, and a trip probability 2330.

The encrypted passenger ID 2300 is the ID of a passenger encrypted in step 2220. The destination 2310 is the destination of the trip pattern affected by the disruption for the particular passenger. If the disruption information 360 indicates that a passenger is affected because one of the passenger's trip patterns is affected (in step 2210), then the destination of the trip pattern affected is used as the destination in the affected passenger list 2010. The arrival time is the time the passenger normally have arrived at the destination had their not been a disruption and the trip probability is calculated using the same technique described above and refers to the probability that the trip pattern is taken in a certain time period. As shown, the affected passenger list 2010 is a list of affected passengers and trip pattern information.

For example, with reference to FIG. 22, if a passenger X wants to travel to Location 5 as a destination from Location 1 as a source, the passenger will use operator 1 to travel through to Location 3 via Location 2. Then use operator 4, which is a different operator than operator 1, to travel to Location 5. If, for example, a service on operator 1 (as indicated in the disruption information) between Location 2 and Location 3 is disrupted, then passenger X is an affected passenger because his trip patterns stored by operator 1 indicates that he uses the service to travel from Location 1 to Location 3 as an origin and destination of the trip pattern. His passenger ID will be encrypted and an affected passenger list will be generated with a destination of Location 3.

Figure 25:
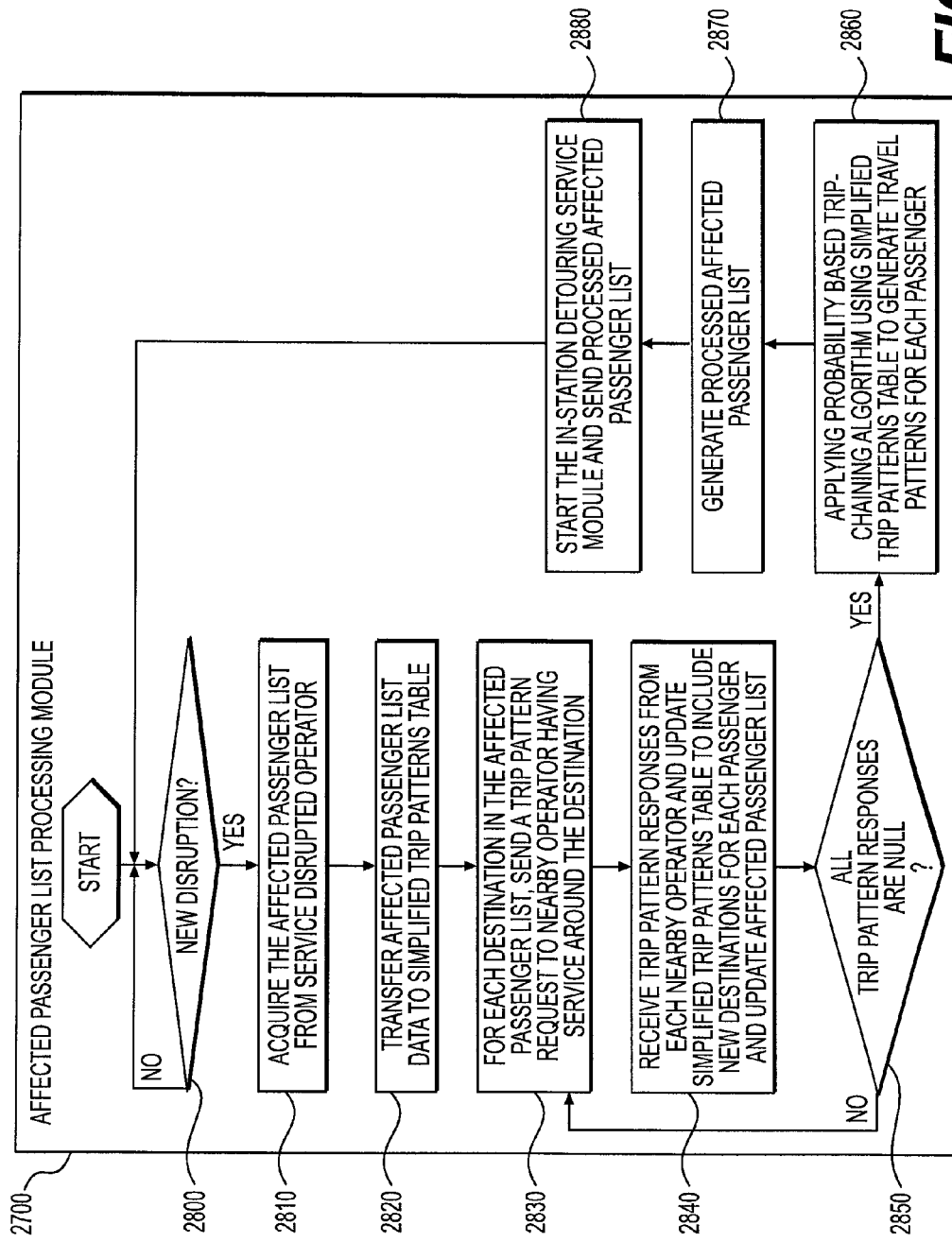
FIG. 25 is a flowchart illustrating processes performed by the affected passenger list processing module of the detouring service provider according to the second embodiment of the present invention.

FIG. 25 is a flowchart illustrating processes performed by the affected passenger list processing module 2700 of the detouring service provider according to the second embodiment of the present invention. At step 2800, the affected passenger list processing module waits for a disruption. If there's a disruption, processing proceeds to the step 2810 to acquire the affected passenger list 2010 from an operator that had a service disrupted. Once the affected passenger list 2010 is acquired, processing proceeds to step 2820 to transfer the data in the affected passenger list 2010 to a simplified trip patterns table, shown in FIG. 27, consisting of simplified trip patterns 3010.

FIG. 27 illustrates exemplary information of simplified trip patterns 3010 according to an embodiment of the present invention. Simplified trip patterns 3010 includes an encrypted ID of a passenger 3012, a source 3014, a destination 3016, an arrival time 3018, and a trip probability 3020. The information in the simplified tip patterns table is updated to include source 3014, destination, arrival time 3018, and trip probability 3020 according to the steps performed by the affected passenger list processing module 2700.

Then, processing proceeds to step 2830 to send trip pattern requests 2020 to operators that have services in the vicinity (around or near) of the destinations in the affected passenger list 2010. In step 2830, the affected passenger list processing module 2700 searches for operators that have services in the vicinity of the destination location identified in the affected passenger list 2010 for each passenger in the affected passenger list 2010. With reference to FIG. 22, if a destination is Location 2, the affected passenger list processing module 2700 searches the transit information 2730 stored in the database 2720 of the detouring service provider to identify operators that have services in the vicinity of Location 2. The transit information 2730 may be searched to identify any operators having a service in an area having a predetermined radius (e.g., 0.25 miles) from Location 2.

Once those operators are identified for a passenger in the affected passenger list 2010, a list of identified operators to which a trip pattern request needs to be sent can be stored for each passenger (or set of passengers as some may have common destination) in a separate temporary storage space within the database 2720. The purpose of sending the trip pattern request 2020 to the other identified operators is to determine whether the passenger has used the other services in the vicinity of the destination based on trip patterns previously stored in each of the respective identified operators. The trip pattern request 2020 has the same information identified in the affected passenger list.

FIG. 26 illustrates exemplary information of a trip pattern request 2020 generated by the affected passenger list processing module 2700 of the detouring service provider according to the second embodiment of the present invention. As shown in FIG. 26, the trip pattern request includes the encrypted passenger ID 2500, destination 2510, arrival time 2520, and probability 2530. The encrypted passenger ID 2500, destination 2510, arrival time 2520 and probability 2530 of a trip pattern request is the same as that in the affected passenger list 2010 for the passenger.

For example, for the scenario involving passenger X, the operators having services in the vicinity of Location 3 are sent a trip pattern request (e.g., Location 5 and Location 4). The trip pattern request in this scenario includes passenger X's encrypted passenger ID, and Location 3 as a destination, the arrival time, and a probability value.

Figure 28:
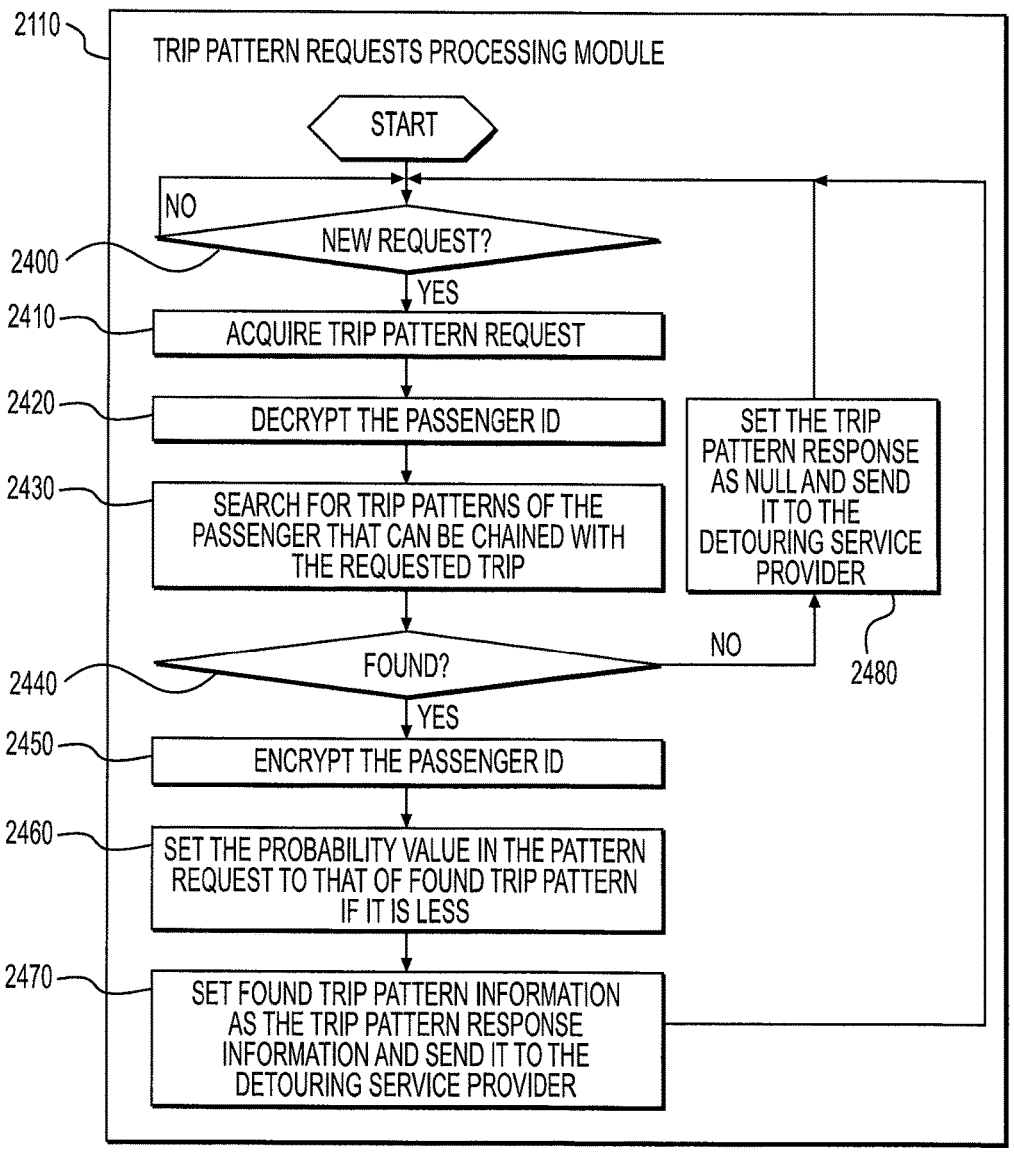
FIG. 28 is a flowchart illustrating processes performed by the trip pattern requests processing module of an operator according to the second embodiment of the present invention.

Once sent to the operators, each operator follows the processes of the trip pattern requests processing module as illustrated in FIG. 28. FIG. 28 is a flowchart illustrating processes performed by the trip pattern requests processing module 2110 of an operator according to the second embodiment of the present invention. At step 2400 the trip pattern requests processing module 2110 determines whether a trip pattern request was received. If yes, processing proceeds to step 2410 to acquire the trip pattern request. If no, the trip pattern requests processing module 2110 waits for a trip pattern request. At step 2420, the passenger ID 2500 of the trip pattern request 2020 is decrypted so the operator can identify the passenger using the passenger ID 2020 to search for previously stored trip patterns the operator may have of the passenger. At step 2430, using processes described above and performed by the probability-based trip pattern chaining module 900, the operator searches for trip patterns that can be chained with the information contained in the trip pattern request (i.e., encrypted ID, destination, arrival time, and probability) based on the probability, origin, destination, and time range of stored trip patterns. If, in step 2440, a trip pattern is found that can be chained with the information in the trip pattern request, the passenger ID of the passenger is encrypted, at step 2450. Further, at step 2460, if the probability of the trip pattern that can be chained (found) is less than the probability identified in the trip pattern request, then the probability value of the trip pattern response is set to that of the found trip pattern. If it is greater than or equal to the probability, then the probability value in the trip pattern response is that of the probability value in the trip pattern request. Step 2470 sets the found trip pattern information (e.g., destination, arrival time, and probability as determined in step 2460) as the trip pattern response 2030.

Figure 29:
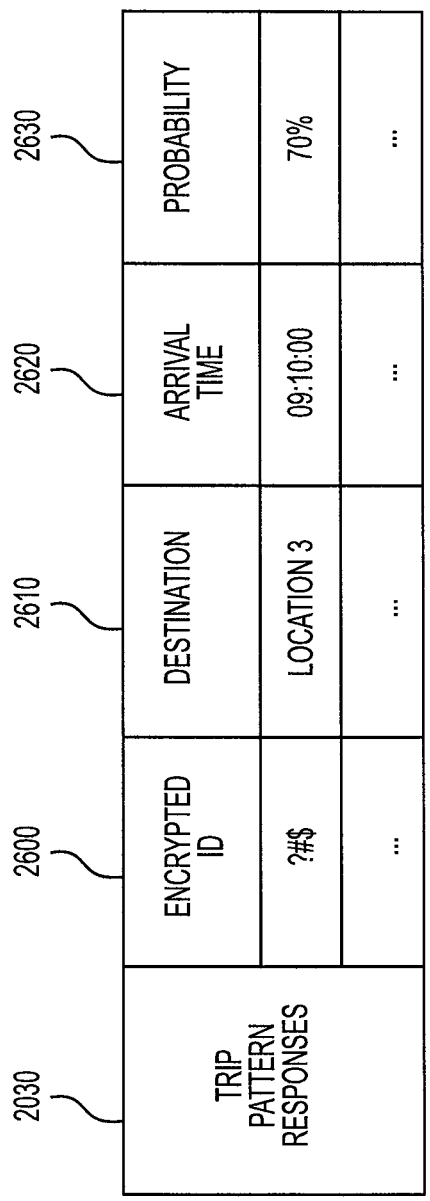
FIG. 29 illustrates exemplary information of a tip pattern response generated by the trip pattern requests processing module of an operator according to the second embodiment of the present invention.

FIG. 29 illustrates exemplary information of a tip pattern response 2030 generated by the trip pattern requests processing module 2110 of an operator according to the second embodiment of the present invention. As shown in FIG. 29, a trip pattern response includes an encrypted ID 2600, a destination 2610, an arrival time 2620, and a probability value 2630. With respect to step 2470, the generated trip pattern response includes the encrypted passenger ID encrypted in step 2450, and the destination and arrival time of the found trip pattern in step 2430. The trip pattern response 2030 is sent back to the detouring service provider. Accordingly, the operator can indicate to the detouring service provider using the trip response that the passenger has, in the past, used the operator's service to get to another destination based on the operator's stored trip patterns for the passenger. Using this information, it can be estimated that the passenger will go to another destination beyond the destination included in the affected passenger list 2010. On the other hand, if at step 2440, a trip pattern is not found, the trip pattern response 2030 is set to NULL and it is sent to the detouring service provider. If the response is NULL, the destination in the current trip pattern request 2020 is estimated to be the passenger's journey destination.

For example, in passenger X's scenario, operator 4 sends back a trip pattern response including passenger X's encrypted passenger ID, Location 5 as the destination, the appropriate arrival time and the appropriate probability value. Passenger X has used operator 4 to travel from Location 3 to Location 5 in the past and therefore, operator 4 has a trip pattern indicating so. The trip pattern is identified in step 2430. On the other hand, operator 3 did not find any trip patterns during the search in step 2430. Accordingly, the trip pattern response sent back to the detouring service provider is NULL.

Step 2840 of FIG. 25 receives the trip pattern responses 2030 generated and sent by the trip pattern request processing modules of the respective operators. In step 2840, the simplified trip patterns 3010 in the simplified trip patterns table is updated according to the trip pattern responses 2030 to include the new (probable) destinations for each passenger (if any). In addition, the affected passenger list 2010 is updated with a new destination 2310, arrival time 2320, and trip probability 2330 based on the trip pattern responses 2030 received for a passenger.

Step 2850 determines whether all the trip pattern responses 2030 are NULL for the trip pattern requests sent to the operators. If yes, then at step 2860 the probability based trip-chaining algorithm is applied to the trip patterns in the simplified trip patterns 3010 table to generate travel patterns for each passenger (see FIG. 10 for exemplary travel patterns). The travel patterns are saved in the database 2720 for each pattern. The probability based trip-chaining algorithm is described with reference to the Probability-based trip pattern chaining module 0900 of FIG. 9.

Subsequently, at step 2870, a processed affected passenger list is generated using the travel patterns generated in step 2860. The processed affected passenger list includes a destination for each passenger. The destination in the affected passenger list is the destination having the highest probability in the stored travel patterns for the passenger. If there are multiple travel patterns with equal probability, the destination of the journey having the shortest duration is chosen. Accordingly, the processed affected passenger list contains the most probable destination of a passenger.

At step 2890, the in-station detouring service module 2710 is started and the processed affected passenger list is passed to the in-station detouring service module 2710. If all of the trip pattern responses 2030 are not NULL, at step 2850, then processing returns to step 2830 until all trip pattern responses 2030 are NULL.

Accordingly, the affected passenger list processing module determines an estimated journey destination of a passenger. For example, in passenger X's scenario, NULL is not sent back from operator 4 in the trip pattern response, rather Location 5 was sent back. Therefore, the destination of the corresponding entry in the affected passenger list is updated to Location 5 (among other updates). Now, in step 2820, operators in the vicinity of Location 5 are searched for and sent trip pattern requests based on the updated affected passenger list entry for passenger X. On the other hand, NULL was sent back from operator 3 for passenger X. Subsequently, when trip pattern responses are received from operators having services in the vicinity of Location 5, they will all be NULL. Then the affected passenger list processing module is able to determine the passengers most probable destination (using steps 2860 and 2870).

Figure 30:
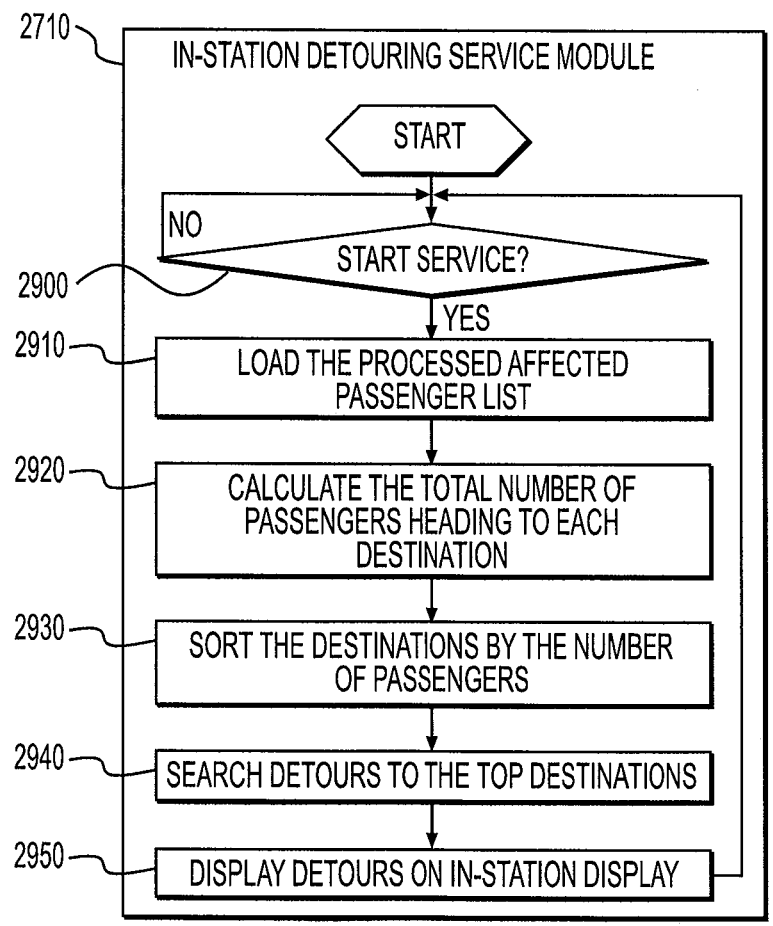
FIG. 30 is a flowchart illustrating processes performed by the in-station detouring service module of the detouring service provider according to the second embodiment of the present invention.

FIG. 30 is a flowchart illustrating processes performed by the in-station detouring service module of the detouring service provider according to the second embodiment of the present invention. Step 2900 determines whether the in-station detouring service module has been initiated. If not, the in-station detouring service module waits until it is initiated. If it has been initiated, then processing proceeds to step 2910 to load the processed affected passenger list from the database (the processed affected passenger list may be passed to the in-station detouring service module). At step 2920, the total number of each passengers estimated to travel to each destination in the processed affected passenger list is calculated and the destinations are sorted by the number of passengers in step 2930. Subsequently, at step 2940, the transit information is searched for detours for each of the top N number of destinations (N is a predetermined integer) using processes described with respect to the detour request processing module 1500 of the first embodiment. Therefore, the most popular destinations are determined. Once the detour for the top number N of destinations is acquired, the detours and top destinations are displayed by the in-station detouring service module on a display. Accordingly, the information is not transmitted back to the operators. Rather, the detouring service provider retains the sensitive information and displays the detours on its own board which is located at stations/locations for affected passengers to view.

Figure 31:
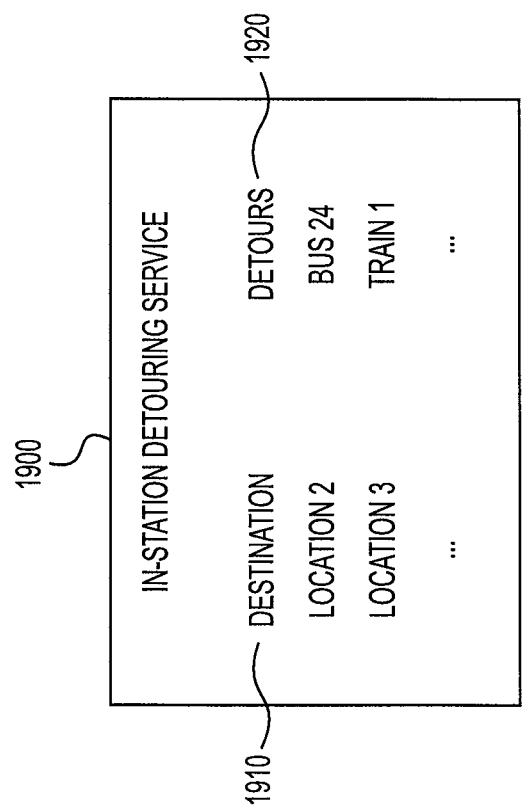
FIG. 31 illustrates an exemplary display of destination and corresponding detour information according to the second embodiment of the present invention.

FIG. 31 illustrates an exemplary display of destination and corresponding detour information according to the second embodiment of the present invention. Although not shown, the display includes hardware and software for connecting to the detouring service provider via a network 2712. The network 2712 may be a WAN, LAN, or other the like facilitating data communication. In addition, although not shown, the detouring service provider includes hardware and software for communicating data to the display 2713 via the network 2712.

The top destinations of stranded passengers are listed 1910 and the corresponding detours are provided 1920. Accordingly, the passengers stranded by the disruption at the location can be informed of detours. The system determines and displays the likely detours based on likely final journey destinations, while maintaining security of personal data of the passengers and operators.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

What is claimed is:

1. A traveling method for a passenger that uses one or more transportation operators, the method comprising the steps of:

generating, by the one or more transportation operators, a plurality of trip patterns which indicate use of one or more services provided by the one or more operators based on transit data collected by the one or more operators that is unique to a passenger, and each of the trip patterns includes an origin location, a destination location, and a time range having a beginning time and an end time;

calculating, by the one or more transportation operators, a frequency value of each of the trip patterns, each of the frequency values indicates a frequency that a trip pattern is used by the passenger during a period of time based on the transit data, and each frequency value is calculated by dividing a number of times one of the respective trip patterns is used by the passenger during the period of time;

sending, by the one or more transportation operators, the trip patterns and the calculated frequency values to a mobile device of the passenger;

receiving, by the mobile device of the passenger, the trip patterns and the calculated frequency values from the one or more operators;

associating, by the mobile device of the passenger, combinations of two or more of the trip patterns with each other to generate a plurality of travel patterns based on at least one of whether a destination of one trip pattern is the same as an origin of another trip pattern and whether an end time of the time range of the one trip pattern is within a predetermined time of a beginning time of the time range of the another trip pattern, wherein each of the travel patterns is assigned a travel pattern frequency value, which is based on a frequency value of a trip pattern of the travel pattern thereof;

sending, by the one or more transportation operators, disruption information which includes a starting location, an ending location, a starting time, and a service resume time;

receiving, by the mobile device of the passenger, the disruption information;

determining, by the mobile device of the passenger, whether the passenger is affected by comparing the disruption information with the travel patterns;

requesting, by the mobile device of the passenger, a detour when the passenger is affected;

receiving, by the mobile device of the passenger, a detour suggestion; and displaying, by the mobile device of the passenger, the detour suggestion and the disruption information.

2. The method for mining travel patterns of a passenger according to claim 1, wherein
the transit data are records stored by the one or more operators and generated by the use of a smart card.

3. The method for mining travel patterns of a passenger according to claim 1, wherein
each of the travel patterns indicate a complete journey of the passenger from one location to another location and include one or more of the trip patterns different from other ones of the travel patterns.

4. The method for mining travel patterns of a passenger according to claim 1, wherein the determining whether the corresponding one of the passengers is affected includes comparing the disruption information with the travel patterns having travel pattern frequencies greater than or equal to a predetermined threshold.

5. A passenger detouring system providing service disruption information, detour suggestion information to a plurality of passengers, and travel demand change information to one or more transportation operators providing transportation services to the passengers, comprising:

one or more operator computing systems corresponding to each of the one or more transportation operators, each of the operator computing systems including a database storing transit data collected by the transportation operator that corresponds to each of the passengers, a detouring service provider computing system coupled to another database;

a plurality of passenger mobile devices, each including a storage device and a computing unit, that correspond to the passengers, respectively, wherein the operator computing systems, detouring service provider and passenger mobile devices communicate via one or more networks, wherein each of the operator computing systems is respectively configured to:

generate a plurality of trip patterns for each of the passengers based on the transit data stored in the database, each of the trip patterns includes an origin location, a destination location, and a time range having a beginning time and an end time; and calculate a frequency value of each of the trip patterns, and each of the frequency values indicates a frequency that a trip pattern is used by one of the passengers during a period of time based on the transit data, and each frequency value is calculated by dividing a number of times one of the respective trip patterns is used by the one of the passengers during the period of time, wherein the computing unit of each of the mobile devices is respectively configured to:

receive the trip patterns and the calculated frequency values for a corresponding one of the passengers from the one or more operators, associate combinations of two or more of the trip patterns with each other to generate a plurality of travel patterns based on at least one of whether a destination of one trip pattern is the same as an origin of another trip pattern and whether an end time of the time range of the one trip pattern is within a predetermined time of a beginning time of the time range of the another trip pattern, wherein each of the travel patterns is assigned a travel pattern frequency value, which is based on a frequency value of a trip pattern of the travel pattern;

receive disruption information which includes a starting location, an ending location, a starting time, and a service resume time from at least one of the operator computing systems;

determine whether the corresponding one of the passengers is affected by comparing the disruption information with the travel patterns; and request a detour when the corresponding one of the passengers is affected;

wherein the detouring service provider computing system is configured to:

search for one or more detours based on one or more detour requests from the mobile devices, generate one or more detour suggestions based on the detours found in the search, transmit the detour suggestions in response to the detour request from the mobile devices, analyze travel demand changes indicating a change in a number of passengers using one or more of the services of one or more of the transportation operators based on the detour requests and detour suggestions, and send travel demand changes to the one or more of the transportation operators.

6. The passenger detouring system according to claim 5, wherein the computing unit of each of the mobile devices is respectively configured to:

determine whether the corresponding one of the passengers is affected by comparing the disruption information with the travel patterns which have travel pattern frequencies greater than or equal to a predetermined threshold.

7. The passenger detouring system according to claim 5, wherein the computing unit of each of the mobile devices is respectively configured to:

determine whether the corresponding one of the passengers is affected by comparing the disruption information with the travel patterns having travel pattern frequencies greater than or equal to a predetermined threshold.

* * * * *